Figure 2:
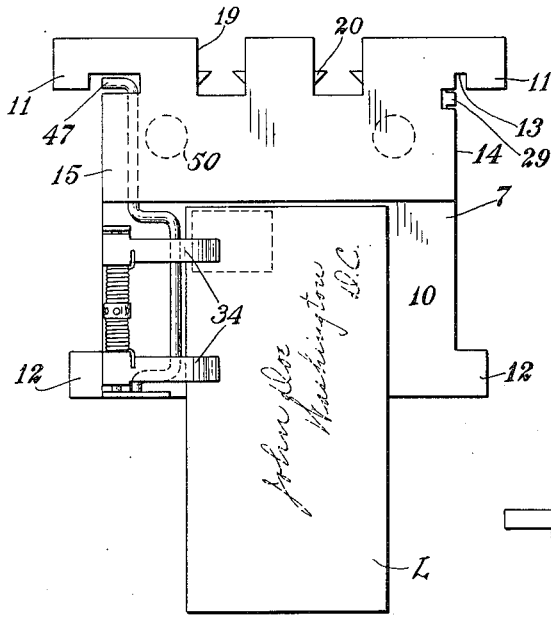

C. C. CADDEN.
MAIL SELECTING APPARATUS.
APPLICATION FILED MAR. 27, 1914.
1,237,747.
Patented Aug. 21, 1917.
12 SHEETS—SHEET 2.
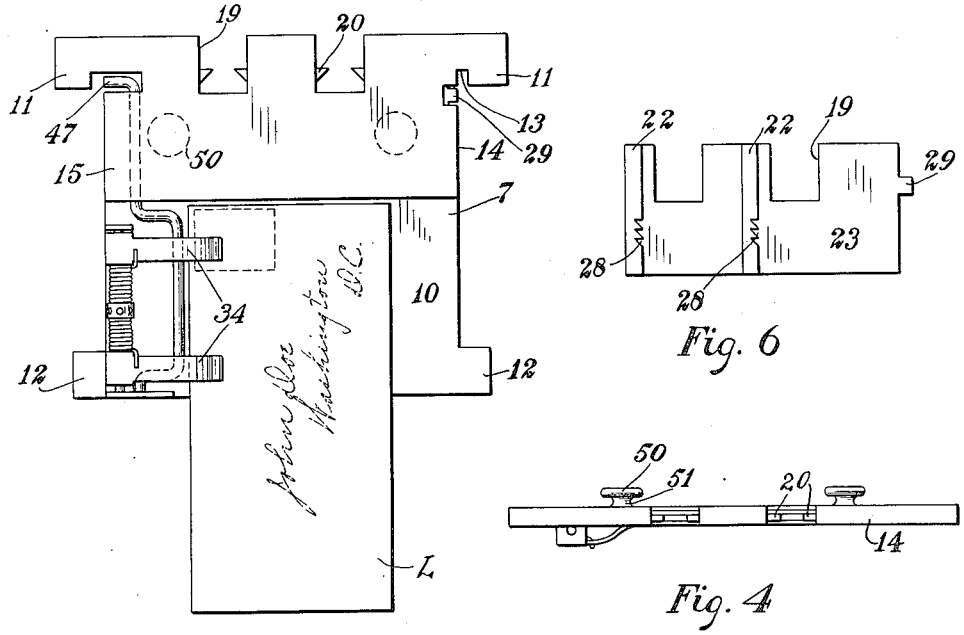
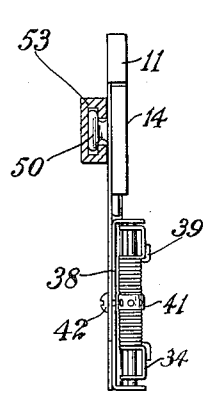
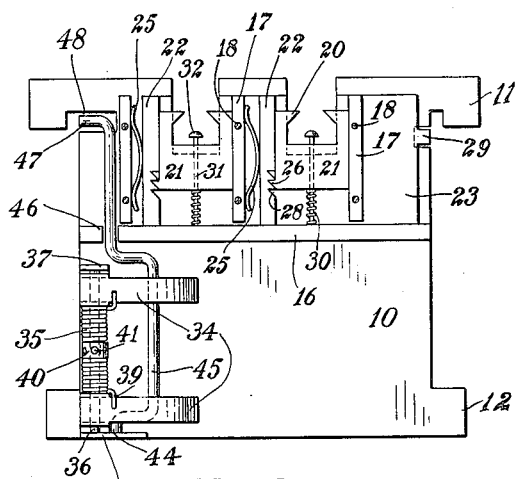

C. C. CADDEN.
MAIL SELECTING APPARATUS.
APPLICATION FILED MAR. 27, 1914.

1,237,747.

Patented Aug. 21, 1917.
12 SHEETS—SHEET 2.

Witnesses
J. Frederic Cherry
Justin W. Macklin

Inventor
Charles C. Cadden,
By Albert T. L. Baker,
Atty.

C. C. CADDEN.
MAIL SELECTING APPARATUS.
APPLICATION FILED MAR. 27, 1914.

1,237,747.

Patented Aug. 21, 1917.
12 SHEETS—SHEET 3.

Witnesses

Inventor
Charles C. Cadden,
By Albert J. H. Baker,
Atty.

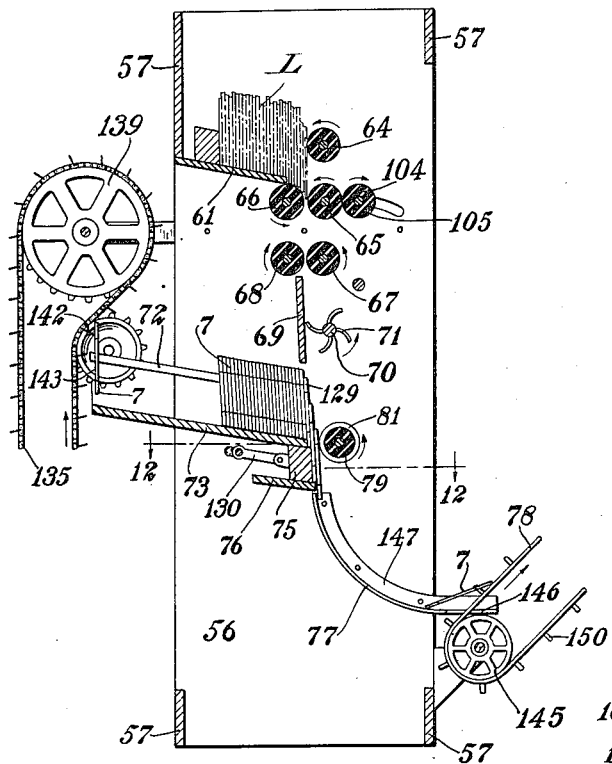

C. C. CADDEN.
MAIL SELECTING APPARATUS.
APPLICATION FILED MAR. 27, 1914.

1,237,747.

Patented Aug. 21, 1917.
12 SHEETS—SHEET 7.

Witnesses
J. Frederic Cherry
Justin W Macklin

Inventor
Charles C. Cadden,
By Albert J.F. Baker
Atty.

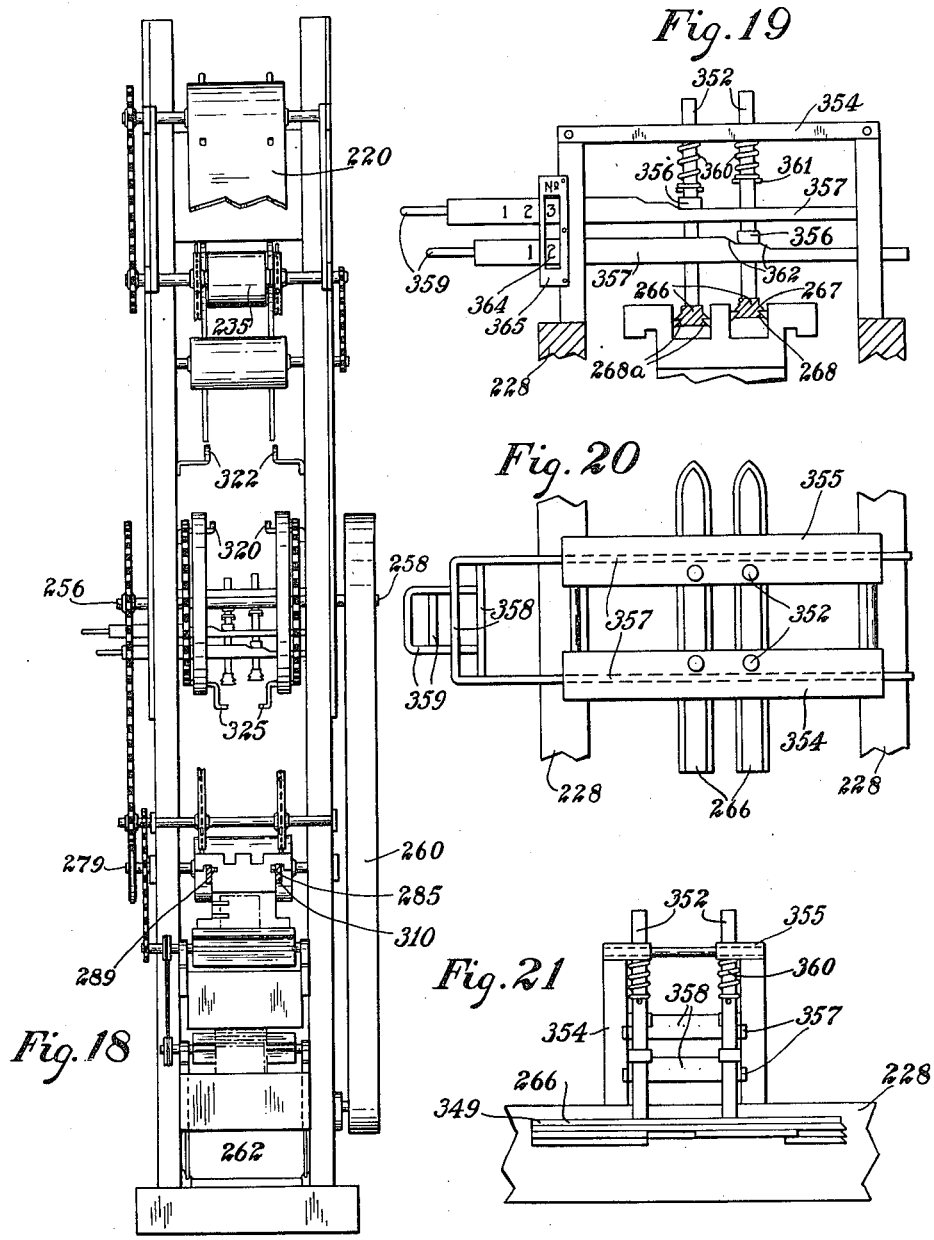

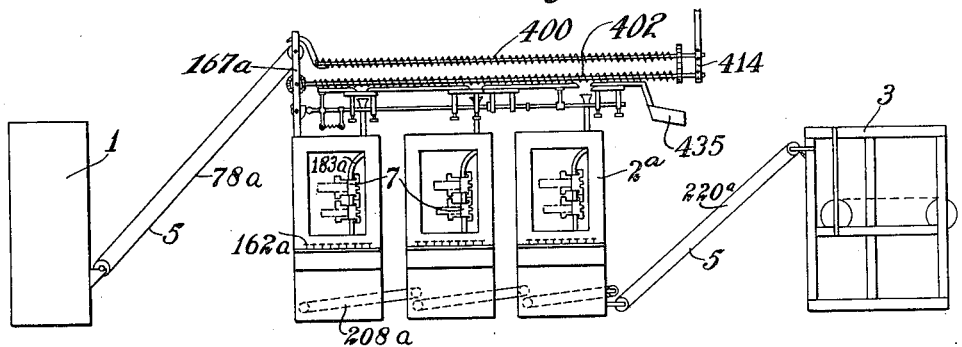
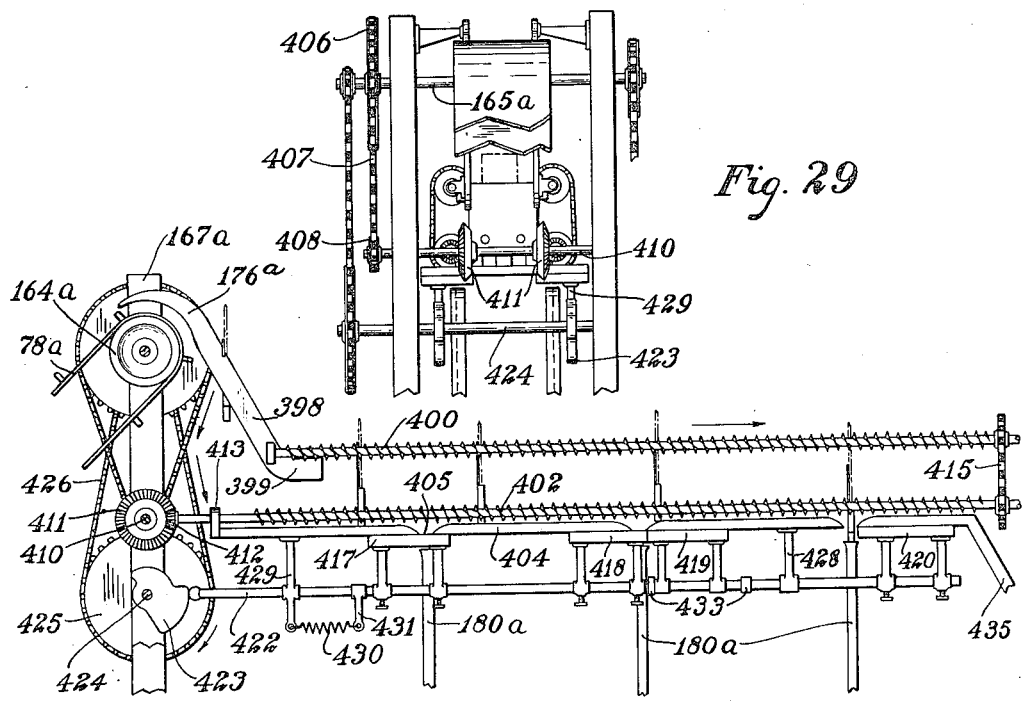

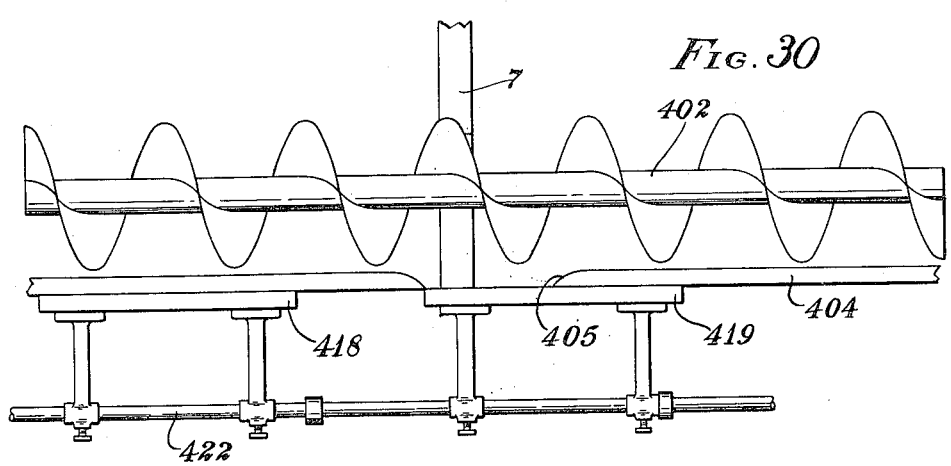
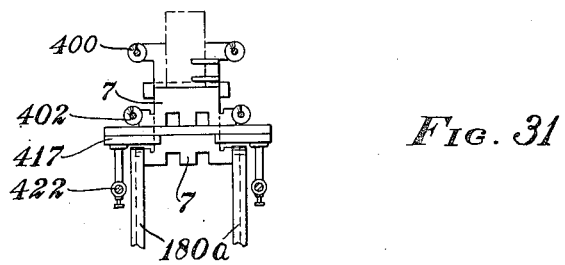
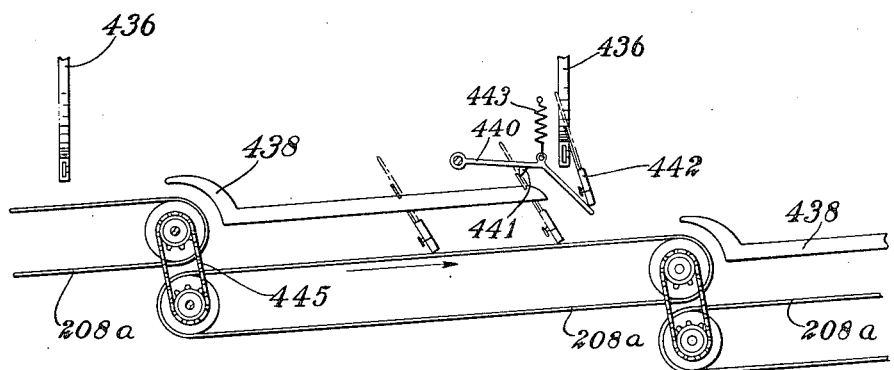

UNITED STATES PATENT OFFICE.

CHARLES C. CADDEN, OF AKRON, OHIO, ASSIGNOR TO MECHANICAL EFFICIENCY COMPANY, OF AKRON, OHIO, A COPARTNERSHIP CONSISTING OF B. G. WORK, J. K. MITCHELL, AND E. C. SHAW, ALL OF AKRON, OHIO, AND CASIMIR GEHRING, OF PARIS, FRANCE.

MAIL-SELECTING APPARATUS.

1,237,747.  Specification of Letters Patent.  Patented Aug. 21, 1917.

Application filed March 27, 1914. Serial No. 827,544.

*To all whom it may concern:*

Be it known that I, CHARLES C. CADDEN, a citizen of the United States, residing at Akron, in the county of Summit and State of Ohio, have invented a certain new and useful Improvement in Mail-Selecting Apparatus, of which the following is a full, clear, and exact description, reference being had to the accompanying drawings.

The object of this invention is to provide a system for rapidly and efficiently selecting letters or other units of mail matter from a general mass or group of mail according to the address thereon, and separating each selected piece from the mass.

To this end I provide carriers having a settable feature and having means for holding the mail matter; mechanism for loading the letters one at a time into the respective carriers, and a mechanism for conveying the carriers successively to a keyboard machine where the carriers bring the letters into a reading position in front of the keyboard operator; I provide mechanism in this keyboard machine coöperating with the settable feature on the carrier, to set the same according to the address on the piece of mail matter on such carrier; I provide conveyer mechanism for transporting the carrier from the keyboard machine to a selecting mechanism, which latter comprises an endless propelling mechanism for moving the carriers past selector bars, which are set according to the route desired, and are adapted to co-act with the settable feature of the carrier to determine which carriers shall remain on the endless propelling mechanism and which shall be removed therefrom; I further provide mechanism for removing the mail matter from the carriers so selected by the selector bars, and conveyer mechanism for returning empty carriers automatically to the loading mechanism.

The selector bars may operate on a principle similar to the distributer bar on the Mergenthaler linotype machine, and act to allow all carriers having a certain setting, (that is a certain positioning of the settable feature) to drop, thereby taking from the general group of pieces of mail matter in a machine those which are to be sent out by the same route.

One form of apparatus by which I accomplish the above results is hereinafter more fully described and explained in connection with the drawings and the essential characteristics of my invention are set forth in the claims.

Figure 6:
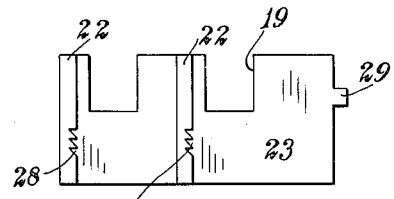
Figure 4:
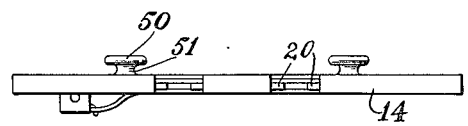
Figure 5:
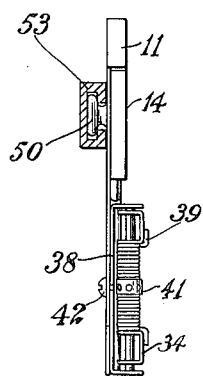
Figure 3:
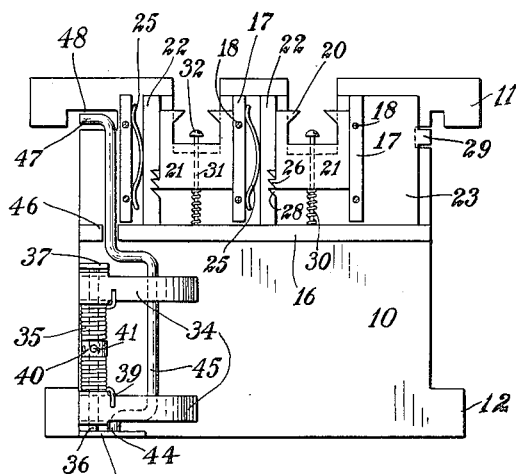
Figure 7:
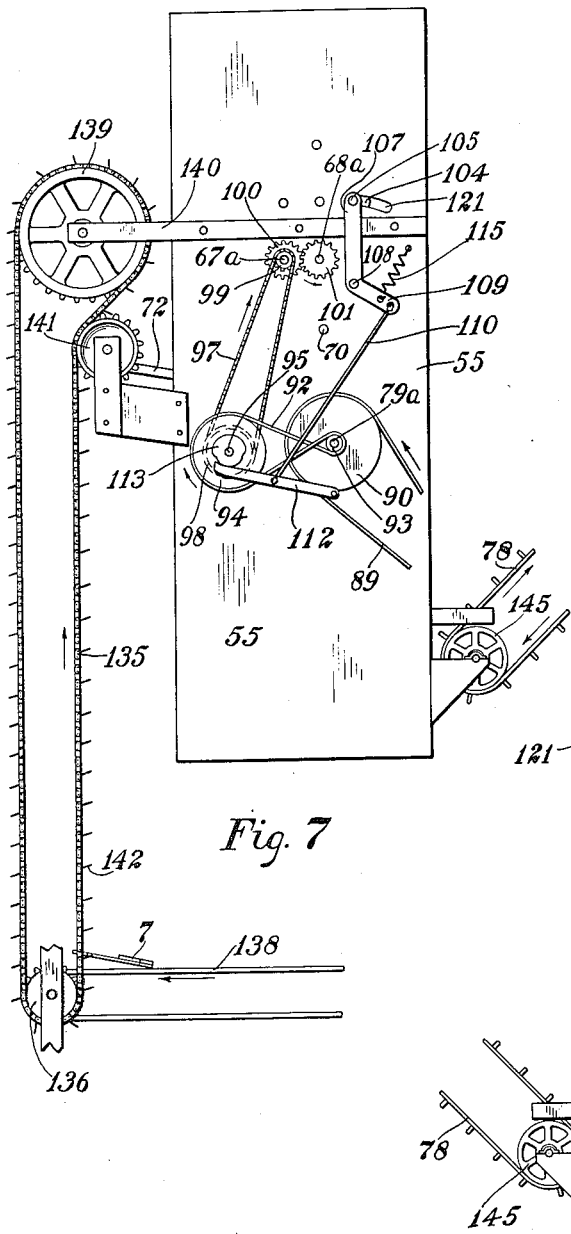
Figure 8:
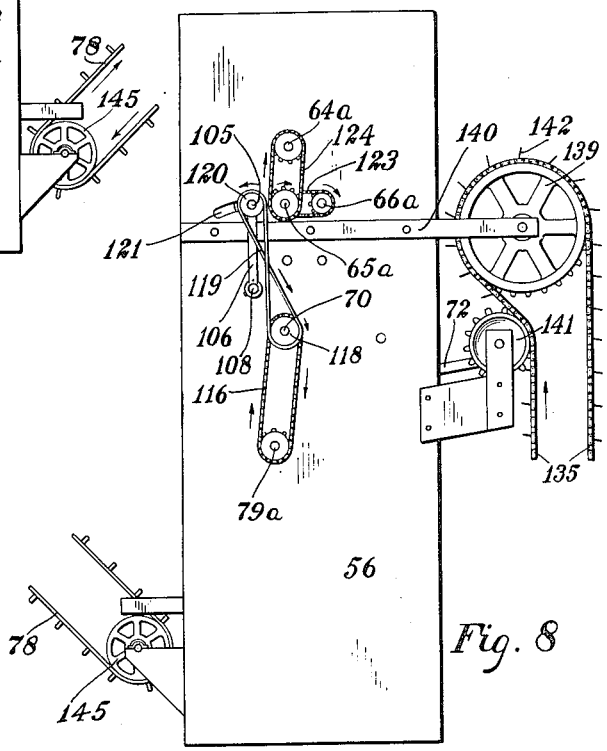
Figure 13:
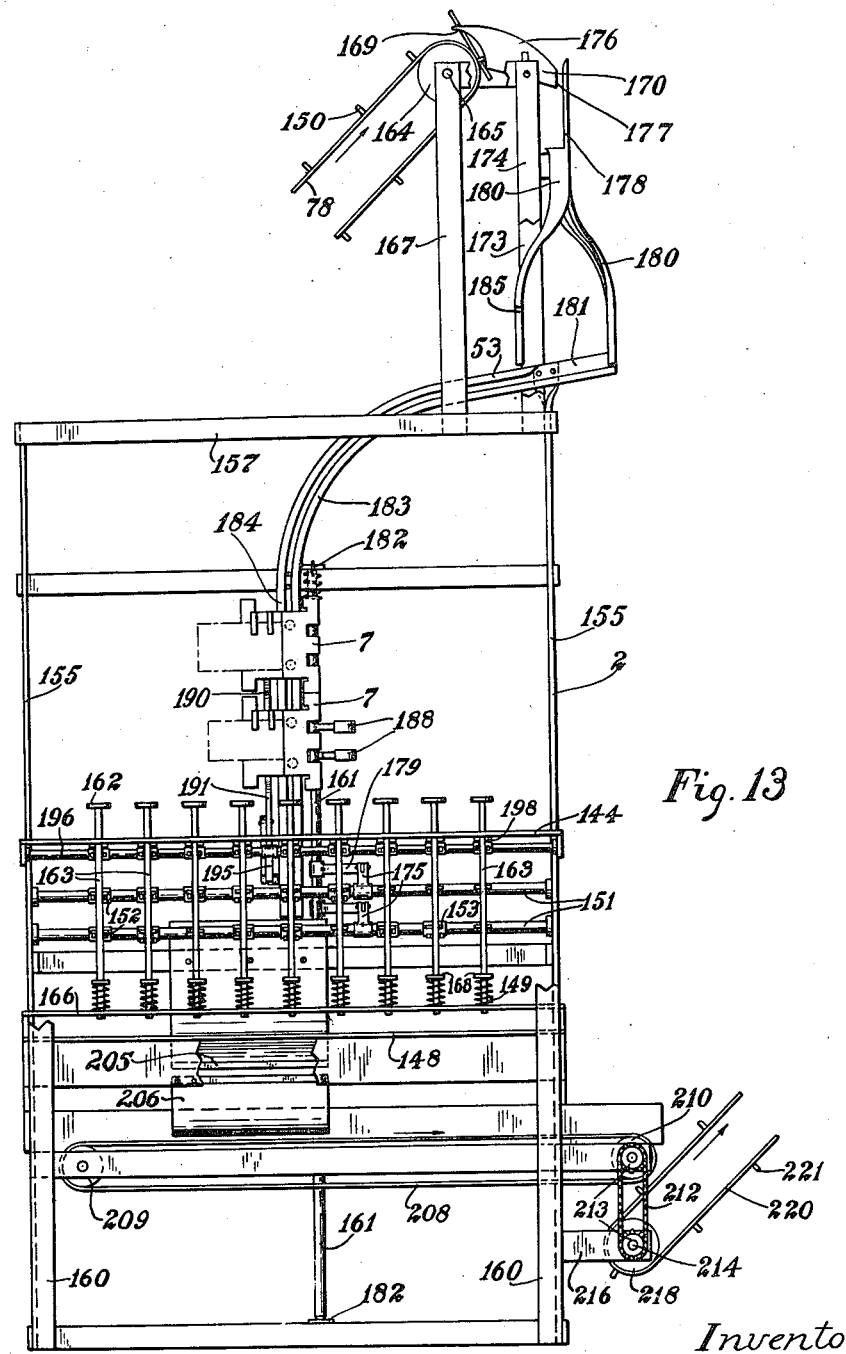
Figure 14:
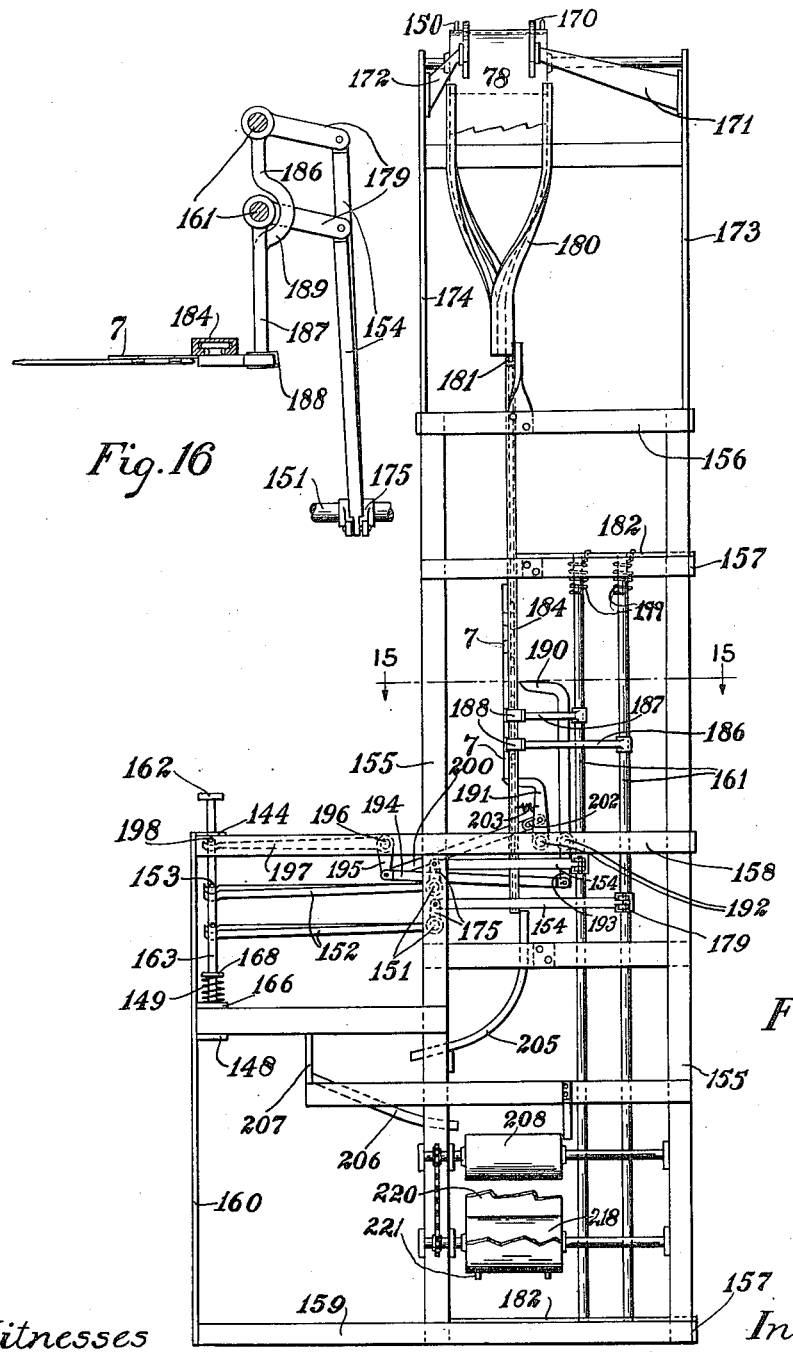
Figure 15:
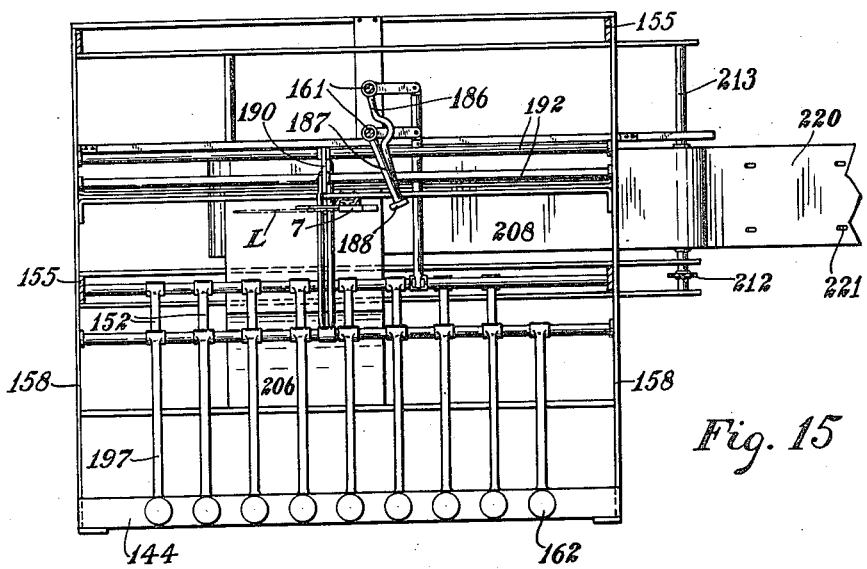
Figure 22:
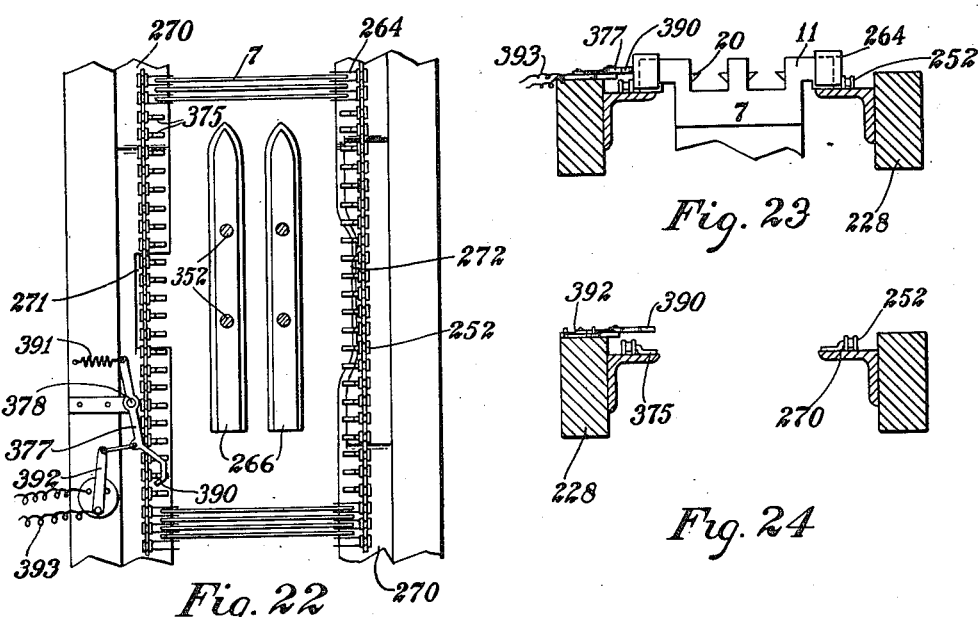
Figure 23:
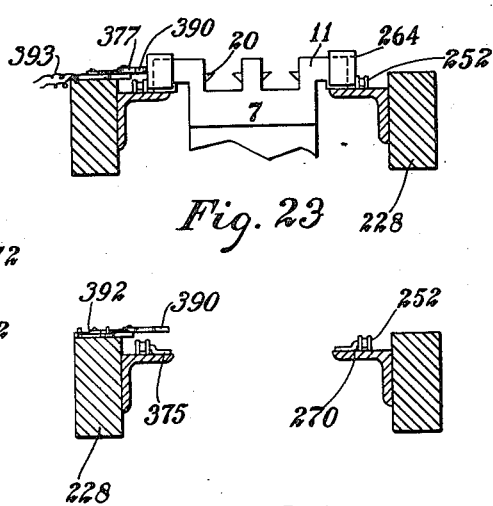
Figure 24:
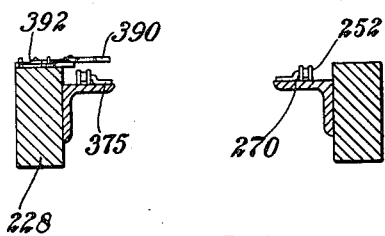
Figure 17:
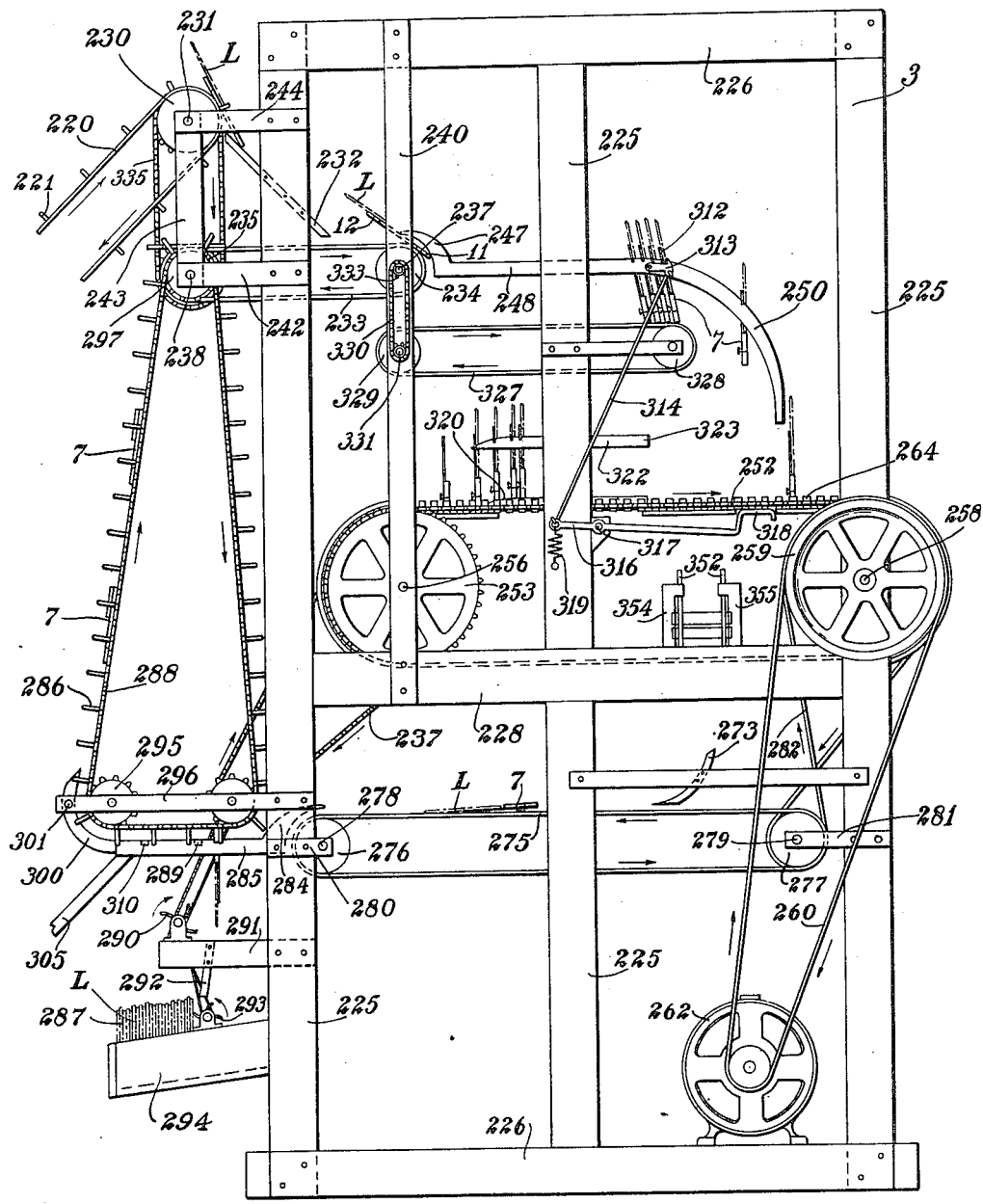
Figure 25:
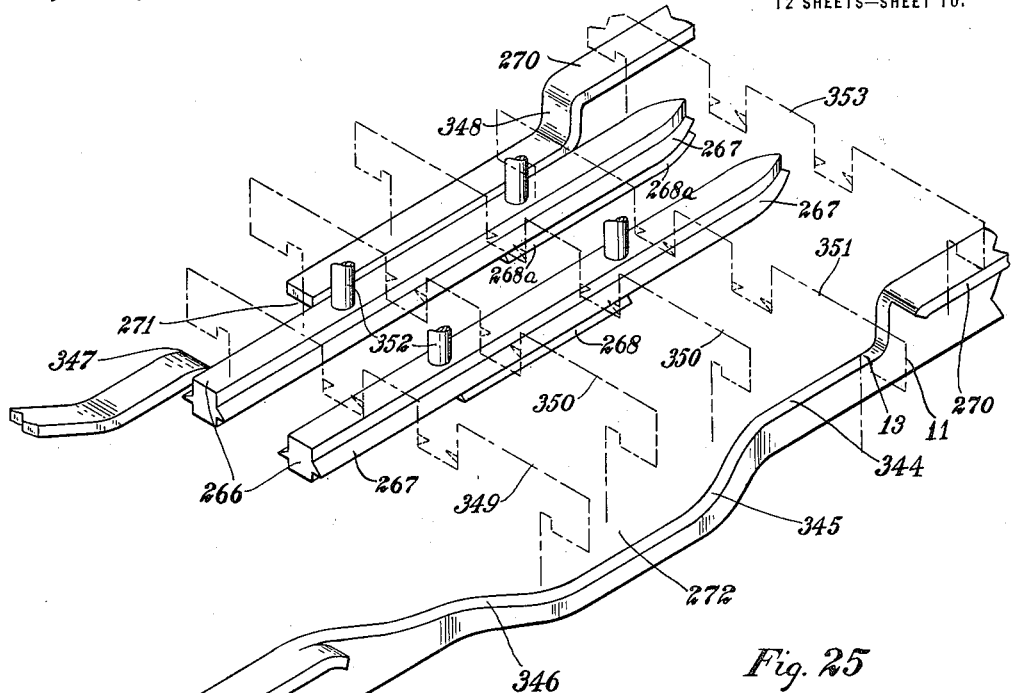
Figure 26:
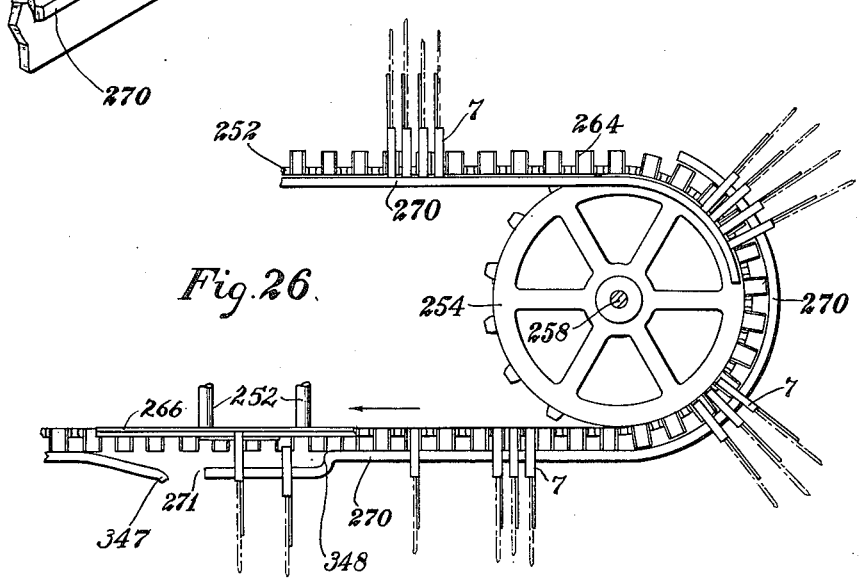

Referring to the drawings: Figure 1 is a perspective view of the mail selecting apparatus showing somewhat diagrammatically the mechanism for loading the carriers, the keyboard machine, selecting machine, and the conveyer mechanism connecting these machines; Fig. 2 is an elevation of a carrier adapted to hold the piece of mail matter and having a settable feature; Fig. 3 is an elevation of the carrier taken on the same plane as Fig. 2, with a plate covering the settable mechanism removed, for clearness of illustration; Fig. 4 is a top edge or plan view of the carrier; Fig. 5 is a side edge elevation of the carrier; Fig. 6 is a detail of a plate comprising part of the settable mechanism and acting to hold and release the same; Fig. 7 is a side elevation of the machine for loading the carriers; Fig. 8 is an elevation of the other side of the same; Fig. 9 is a vertical section through the loading mechanism showing the relative positions of the feeding rolls, the letters and the carriers; Fig. 10 is an elevation of the loading machine taken on the side from which the carriers are taken; Fig. 11 is a plan of the loading machine; Fig. 12 is a section taken on the line 12—12 of Fig. 9, showing the mechanism for bringing the carriers into position for receiving letters; Fig. 13 is a front elevation of the keyboard mechanism showing the guideways for bringing carriers to the reading position, and the conveyer mechanism for taking the carriers from the machine; Fig. 14 is a side elevation of the keyboard machine; Fig. 15 is a sectional plan view taken on the line 15—15 of Fig. 14, showing particularly the connections between the keys and the mechanism for setting the carriers; Fig. 16 is an enlarged detail showing the pushers for setting the carriers in operative position when a key is depressed; Fig. 17 is a side elevation of the selecting machine showing the various conveyer mechanisms for handling the carriers; Fig. 18 is an end elevation of the same taken on the side from which the carriers are fed; Fig. 19 is an enlarged sectional detail showing the selector bars and mechanism for positioning or setting the same according to different routes; Fig. 20 is a plan of the selector bars and their setting mechanism; Fig. 21 is an enlarged detail on the same scale as the last two described figures, being a side elevation of a selector bar with a portion of the support broken away for clearness of illustration; Fig. 22 is also an enlarged detail of the selector bars showing a portion of the chain for propelling the carriers and showing an automatic switch for stopping the mechanism; Fig. 23 is a detail on the same scale, being a cross section through the supports showing a carrier in position in the propelling chain; Fig. 24 is a sectional detail of a chain showing projections adapted to coöperate with the carrier controlling device, hereinafter described; Fig. 25 is a perspective view of the selector bars showing the relative positions of carriers having different settings, as they are passing the selecting device; Fig. 26 is a sectional view showing the propelling chain of the selecting mechanism and the guides for keeping the carriers in the chain; Fig. 27 is a diagrammatic view showing the use of a compound keyboard mechanism with conveyer mechanism for bringing carriers into a plurality of reading positions allowing several operators to work at one time, showing connections between the carrier loading mechanism and the keyboard mechanism, and between the keyboard mechanism and the selecting mechanism; Fig. 28 is a side elevation on an enlarged scale of the mechanism for bringing the carriers alternately to the various reading positions with the mechanism for driving and operating the same; Fig. 29 is an end elevation of the mechanism shown in Fig. 28, clearly illustrating a suitable driving mechanism; Fig. 30 is a still further enlarged detail of one of the gates operating to discharge the carriers to one of the reading positions and showing one of the spiral screws for propelling the carriers; Fig. 31 is a cross section of this mechanism taken on the same scale as Fig. 28, showing a carrier being propelled by the propelling means, and showing the carrier dropping through one of the gates; Fig. 32 is a detail of the belts for conveying the carriers from each reading position, this figure being a side elevation of the conveyer belts and showing a device for preventing the carriers coming one on top of another as they are discharged by keyboard mechanism from any of the reading positions.

Referring to Fig. 1, 1 indicates the loading machine which is adapted to feed the carriers one by one into positions to receive letters and place individual letters into each carrier; 2 indicates the keyboard mechanism which is adapted to position the settable mechanism on the carrier according to the address on the letter carried thereby; 3 indicates the selecting machine, having mechanism adapted to move the carriers continuously past the selector device and which is provided with mechanism for loading the carriers into the continuous propelling mechanism, and is also provided with means for removing the letters from the selected carriers; 5 refers generally to the mechanism connecting each of said machines for conveying the carriers from one machine into another, in the order above named, and from the selecting machine, back to the loading machine. Each of the mechanisms comprising my apparatus is hereinafter fully described.

The articles to be selected are herein referred to as pieces of mail matter, and for convenience, more frequently as "letters", but it is to be understood that my selecting system may be adapted for any class of small articles, to be selected according to certain characteristics thereof.

Referring first to the carrier, designated 7: This carrier comprises a plate 10, having ears 11 projecting from two opposite sides at the upper edge, with undercut portions 13 and ears 12, projecting from the same opposite sides at the lower edge. These projecting ears furnish a means for sliding the carriers over rails which the ears engage, and for propelling them in the selecting machine and for conveniently handling them throughout my system, as will be hereinafter described. At the upper portion of the carrier is formed a narrow housing 14. The plate 10 forms the back side of the housing, while the front side is formed by a cover plate 15, mounted on a cross member 16 and vertical strips 17, secured to the plate 10, the cover being secured to these by means of rivets or screws, such as shown in section at 18. The cross rib 16 closes the lower side of the casing, while flanges turned either from the plate 10 or the plate 15, may close the remaining sides of this casing, as shown.

At the upper edge of the housing are formed rectangular notches 19, into which project prongs 20 of the settable slides 21. These slides are mounted between the plates 10 and 15, and as shown, are vertically guided by two of the ribs 17, and two ribs 22, which are carried on a laterally slidable plate 23, held in the position shown by leaf springs 25, mounted between the ribs 17 and 22. As shown these slides have beveled projections 26, adapted to engage corresponding notches 28 in the vertical strips 22. The lateral movement of the plate 23 allows the slides to be depressed, but presses the strips 22 toward the slides engaging their projections, and the springs 25 hold them in the position last given them. The plate 23 may be moved laterally (to the left in Figs. 2 and 3), by means of a projection 29 when engaged by a suitable cam, thereby releasing the slides and allowing them to return to their normal position under the influence of small spiral springs 30, surrounding pins 31, extending through the slides and each having a head 32 adapted to limit the upward movement of the slides.

The letters are secured to the carrier by means of two clamps or grippers 34, pressing toward the plate 10 under the action of coiled springs 35 mounted on a rod 36, secured in ears 37, bent up from the end of a short strip 38, which is secured to the plate 10. The clamps 34 are pivotally carried on this short rod or pin 36, and the springs are bent over the clamps as at 39, to press them toward the plate. A nut or block 40, rotatably mounted on the rod 36, to which these two springs are attached, is provided with a plurality of threaded holes 41, any of which may be engaged by a screw 42, extending through the plate 10. This provides for changing the tension on the springs 35. A rod 44 pivoted at its lower end to the ear 37, has an offset portion 45 forming a crank engaging the grippers 34 to raise them, and extends between the ribs 16 and 46, thus providing a pivot point at either side of the crank portion. At its upper end the rod is bent outwardly at 47, forming a small lever arm operating in a slot 48 in the plate. This allows cams or projections in the loading and discharging mechanisms, acting on this portion 47 of the rod to momentarily raise the grippers 34 to allow a letter to be inserted or removed from the carriers. Fig. 6 is a detail of the plate 23, showing the notches 28, the rectangular notches 19, and the strips 22 carried by this plate. When the plate is pressed inwardly toward the left, it carries these strips out of engagement with the projections 26, allowing the upward movement of the slide 21 as described.

To provide for bringing the carriers properly to the reading position and to guide them through the keyboard machine, I provide guide heads or buttons 50, having undercut shanks 51, secured to the plate 10. These heads are adapted to engage T-slots in a guideway 53, as will be hereinafter described. There are preferably two of these heads, so arranged that the carrier may be guided along a curved trackway, and they are properly spaced apart so that the carrier may be brought to the desired position in the keyboard machine.

The carrier just described, is adapted to grip and release letters and similar pieces of mail matter, and has settable mechanism adapted to be positioned according to the address on such letter. The slides 21 are adapted to be placed in any of three positions, and may be in various positions relative to each other thereby allowing a combination of positions, which combination is adapted to represent a certain route corresponding to the address on a letter. It will be seen that by increasing the number of slides 21, and increasing the number of notches 28, that is the number of positions of these slides, that a very much larger number of combinations may be obtained. The drawings show a carrier having two slides of three positions each, which provides for nine combinations, but this is merely illustrative of any number of combinations.

The machine for loading the letters into the carriers may be of any convenient construction adapted to feed the letters one by one to carriers having their grippers open to receive the letters, and adapted to discharge the loaded carriers from the machine.

The loading mechanism may be mounted in any suitable frame, which as shown comprises two side members 55 and 56 connected by various cross members 57. These side members form the supports or bearings for various cross shafts for supporting the letter feeding rollers and carrier feeding mechanism. The letters L are carried vertically on one edge, in a chute 61 having a guide 62 for one edge of the letters, adapted to aline one edge of all the letters so that they may be properly received in the carriers.

As shown, the foremost letter L is engaged by a resilient roller 64 which is rotated in the direction to feed this letter downwardly, and it passes between two rollers 65 and 66, the outer roller 65, rotates in a direction to pass the letter downwardly while the one under the pile 66 rotates in a direction to push the letters back, thereby separating the first letter from the remaining letters and preventing more than one letter being fed downwardly at a time. The rollers 67 and 68 receive the letter from the rollers 65 and 66, and feed it downwardly along the guide 69 where it is engaged by a brush or flier 70 having a series of flexible wings 71, normally brushing the guideway 69 and insuring the letters entering the grippers of the carriers.

The carriers 7 are placed in the machine between the guides 72 and rest on a downwardly inclined guide 73. One by one they slide off from this guide, by gravity or other suitable means, and drop onto a support 76 ahead of a pusher or plunger 75, adapted to move the carrier past a cam 74, Figs. 10 and 12, which engages the projecting end 47 of the rod 44, thereby opening the grippers to receive the letter, which is at that moment being sent downwardly from the common pile. As each carrier is pushed forward by the plunger behind it, it passes this projection allowing the grippers to engage the letter, and drops onto an arcual chute 77 comprising two guides which lead the carriers downwardly to a conveyer belt 78, to be hereinafter described. A roller 79, having resilient flanges 81, is adapted to engage the carriers as they are pushed forward by the pusher 75, and start them instantly downwardly onto the chute 77.

The mechanism just described, may be driven by a suitable motor 84, Fig. 1, which through a belt 85 drives a shaft 86 supported on suitable hangers 87 adjacent the frame of the letter loading machine. Running over a small pulley on this shaft, is a belt 89 which drives a pulley 90 on the shaft 79$^a$ of the roller 79. A belt 92 running over a small pulley 93 on the shaft 79$^a$, drives a comparatively larger pulley 94 on the shaft 95, a sprocket chain 97 running over a sprocket 98 on the shaft 95, and over a sprocket 99, drives the shaft 67$^a$ of the roller 68 to which it is attached. This shaft 67$^a$ is provided with a gear 100 meshing with a gear 101 on the shaft 68$^a$, thereby driving the roller 67 with the same surface speed as the roller 68. The flier or brush is driven by a sprocket chain 116 running over suitable sprockets on shafts 70 and 79$^a$. This much of the mechanism is driven constantly.

It is desirable to drive the rollers 64, 65 and 66 at such times that the letter will be fed to the carrier at the proper moment. Accordingly these three rollers are driven intermittently by a roller 104 carried on a shaft 105, which extends through the sides 55 and 56 of the frame, and is carried on the upper end of rock arms 106 and 107, pivoted on the shaft 108. The arm 107 is rigid with another arm 109, forming a bell crank, and at its outer end is attached to a connecting link 110 connected at its lower end to a lever 112 bearing against a cam 113 on the shaft 95. This cam is so arranged that at the proper time, the lever 112 is depressed, drawing downwardly on the arm 109 and swinging the roller 104 out of contact with the roller 65, thereby stopping the initial feeding rollers. As soon as the low portion of the cam 113 is reached, however, a tension spring 115 attached to the arm 109 of the bell crank and to the frame, swings the roller 104 into contact with the roller 65, thereby driving it. The means for driving the roller 104 and the initial feeding rollers comprises a pulley 118 on the shaft 70, over which runs a somewhat elastic belt 119, driving a pulley 120, on the end of the shaft 105. The belt 119 being elastic, allows constantly for the movement of the shaft 105 in slots 121 in the sides of the frame, and permits the swinging movement of the shaft 105 about the shaft 108. A sprocket chain 123 running over suitable sprockets on the shafts 65$^a$ and 66$^a$, drives the roller 66 and a similar chain 124 running over suitable sprockets on the shaft 65$^a$ and 64$^a$, drives the upper feeding roller 64, thereby giving these three rollers their proper direction.

The supports 73 and 76, act as guides for the pusher 75, which is reciprocated by links 130, pivotally connected to the pusher and having their other ends rotatably engaging an offset intermediate portion 131 of the shaft 95, thus forming a crank.

To sum up the operation of the loading machine: The pusher 75 draws back beneath the support 73, allowing a carrier to fall onto the support 75, which positions it so that the arm 47 will engage the cam or projection 74. A forward movement of the pusher thereby opens the grippers 34. A letter 60, having been previously fed from the mass above by means of rollers 64, 65, 67 and 68, as described, is in proper position to be engaged by these fingers or grippers. A further forward movement of the pusher releases the arm 47 which clamps the letter to the carrier, and drops it onto the chute 77.

The carriers are placed in proper position by two chains 135 running over sprockets 136 and over sprockets 139 carried by supports 140 secured to the frame of the letter loading machine. One reach of each chain 135 extends vertically from one side of the sprockets 136, to an idler sprocket 141 and then inclines upwardly to the sprocket 139. Extending inwardly from various links of the chains 135, are L-shaped fingers 142 having the feet portion of the L extending outwardly and inclined slightly. These fingers engage the ears 12 of carriers as they are brought along a conveyer belt 138 (leading from the selecting machine) and raise them to the inclined portion of the chain where they drop onto the rails 72. The angle of the chain between the sprockets 141 and 139 is such that the feet of the fingers incline downwardly, allowing the carriers to slide off as shown at 143.

As before stated, the loaded carriers are dropped into an arcual chute 77, bringing the carriers onto a conveyer belt 78, which at this end runs over a pulley 145, and passes between the lower ends of the arcual members of the chute 77. These members are preferably made of angle strips, and at their ends the inwardly extending horizontal portions are cut away at 146, allowing the sides of the belt to pass between the vertical portions 147 of the members 77, thereby bringing projecting fingers 150 on the belt 78 into position to engage the ears of the carriers to convey them upwardly to the keyboard machine, as shown in Fig. 13.

Referring next to the keyboard machine, I will first describe this mechanism as adapted for one operator, as shown in Fig. 1 and in Figs. 13 to 16 inclusive. The frame of this machine comprises vertical members 155 connected by various cross members 156 extending from front to back and cross members 157 extending across the machine sidewise at the intermediate portion of the upright member 155. Two of the cross members designated 158 are extended forwardly and the cross members at the bottom 159, are extended forwardly. At the ends of these are secured vertical members 160, braced by various cross members and forming the frame work for supporting the keys 162.

At the upper end the conveyer belt 78 runs over a pulley 164, carried on a shaft 165, supported between two upright members 167, secured to the upper member 157 of the frame. As the carriers conveyed upwardly by the projections 150, reach the pulley 164, the forward ears 11 are engaged by curved surfaces 169, substantially concentric with the shaft 165, and being formed on the edge of vertically mounted plates 170. These plates 170 are carried by suitable brackets 171 and 172 secured to upright members 173 and 174 respectively, these members being carried by the cross members 157 of the upper end of the frame. The upper edge of plates 170 have a slanted and slightly curved surface 176, which engages the other ear 12 of the carriers, as the ears 11 engaging the edge 169, are brought downwardly by the rotation of the belt. This inverts the carriers, and as they drop off from the end 177 of the plate 170, they engage guides 178 bringing them downwardly into a chute 180.

The chute 180 comprises two channel members, each given a quarter turn as shown, and so spaced apart that they constantly engage the four ears of the carriers bringing the carriers downwardly onto a T-slotted guide 53, heretofore mentioned in connection with the carrier. This guide has one side cut away as at 181, allowing the heads 50 of the carriers to engage the lower rail of the guide. At this point the guide is slanted upwardly so that as soon as the carriers enter, they slide forwardly and down the curved portion 183 coming to the vertical portion 184 where they are stopped in full view of the operator of the keyboard.

At the portion where the slotted guide is cut away allowing the entry of the carriers, it is necessary to discontinue the channel members of the guides 180, as shown at 185, allowing the carriers to slide beneath this channel member and downward into the reading position as described.

The keyboard may be provided with any suitable mechanism connecting each key with hammers adapted to depress the slides 21 in the carriers, to certain positions corresponding with the addresses on the letters. As shown, the keys 162 are mounted on vertical slide bars 163, extending through cross pieces 144 and 166 of the frame, and when fully depressed abutting a cross piece 148 at the lower ends, to limit the downward movement. They are provided with intermediate collars 168, against which bears a spring 149, surrounding each of the plungers, to return them to normal position after depression.

Mounted between two of the uprights 155, are two rock shafts 151 having forwardly extending rock arms 152 with their forward ends adapted to engage pins 153 carried by the slide bars 163. Each of these rock shafts is common to all of the keys and is provided with rock arms 175 connected by links 154 to rock arms 179 mounted on vertical rock shafts 161, rotatably mounted in suitable cross members 182 of the frame. On the rock shafts 161 are arms 186 and 187, the arm 186 being offset at its intermediate portion as at 189, to extend around the forward rock shaft 161. Carried on the forward end of these rock arms 186 and 187 are hammers or pushers 188, adapted to position the slides of the carriers.

When a key is depressed, the pins 153 engage the free ends of the rock arms 152, thereby rocking either or both of the shafts 151 and drawing forward on the links 154 rotating the rock shafts 161 and swinging the arms 186 and 187 inwardly, bringing the pushers 188 into contact with the slides on the carriers. The pushers are then returned to idle position by coil springs 199 on the shaft 161, each having one end secured to the shaft and the other to the bearing member. In order that these pushers may move the slides on the carriers to the proper position corresponding to the key depressed, I so position the pins 153 on the slide bars that when the key is fully depressed it will move the rock arms 152 the proper distance.

In order that each key when depressed, will set a different combination of positions of the slides of the carrier, the pins 153 are differently positioned on each slide bar; for example, the key at the left has its pins in position to entirely depress both the rock arms 152, the next adjacent key would depress one rock arm clear down, and the other only enough to move the corresponding slide one notch, while one of the keys, the one shown at the extreme right, would have no connection with the rock shaft, but would act only to discharge a carrier, leaving both its slides in the first position. A use which may be made of this key would be to discharge carriers which might not have been properly loaded.

As shown, the means for stopping the carriers in the reading position and discharging them from the same (this may be any suitable escapement mechanism) comprises two trip catches 190 and 191, pivoted on shafts 192, supported by the frame members 158. The escapement dog 190 has a depending arm 193, pivotally connected at its lower end with a link 194 which is pivoted at its forward end to an arm 195 on a rock shaft 196. Rigid with this rock shaft 195 are forwardly extending arms 197 adapted to be engaged by the pins 198. There is preferably one of these arms for each of the slide bars 163, so that when any one of the keys is depressed, the escapement rock shaft 196 will be operated. Attached to the other side of the rock arm 195, is a link 200 having a slotted pivotal connection with the escapement dog 191. This slot allows the key bar to be slightly depressed, throwing the hooked upper end of the dog 190 under the second of the carriers in the reading position and bringing the hammer or pusher 188 into engagement with the slide 21 before the dog 191 is pushed backwardly from beneath the lower carrier allowing it to drop.

Accordingly, when a key is depressed, the first part of the movement brings the pushers 188 into contact with the slides and positions them accordingly, at substantially the same time through the link 194, pushes the point of the dog 190 into the path of the carrier above the one being set. By the time this movement is accomplished, the link 200 is moved enough so that its lost motion connection 202 is engaging and pushing the dog 191 out of the path of the carrier being set. Thus the dog 190 supports the carrier above the one just set, while the dog 191 is pushed out of the way, allowing the set carrier to drop, and on the return movement of the key the spring 203 draws this dog 191 into the path of the next carrier, which is at that time released by the dog 190. At the finish of the movement, the dog 191 is then in substantially the position shown, and the dog 190 would be again drawn out of the path of the upper carrier.

The released carriers fall onto an arcual chute 205 and are slid forward off from this chute onto a second chute 206, abutting a stop 207 and sliding onto a belt 208 mounted on pulleys 209 and 210, carried by the frame of the machine. This belt is propelled by a sprocket chain 212, running over suitable sprockets 213, the lower one of which is rigid with the shaft 214, carried by arms 216 and having rigid thereon a driven pulley 218. Over this pulley 218, runs a belt 220 having projections 221 corresponding to the projections 150 on the belt 78. The direction of the belt 208 as indicated by the arrow, is such that carriers falling thereon are brought to the belt 220 and the projections 221 pick up the carriers in the manner described in connection with the belt 78, and conveys them to the selecting machine.

The selecting machine comprises mechanism adapted to remove the carriers having certain combinations of positions of the carrier slides from the general group, and mechanism for propelling the carriers in succession past the selecting or removing mechanism, as well as mechanism for removing the letters from the selected carriers.

This selecting mechanism is shown in Figs. 1 and 17 to 26 inclusive. A suitable frame for this machine comprises vertical members 225 and cross members 226 at the top and bottom, with intermediate cross members 228 connecting these vertical members. Attached to these members are suitable cross members and projecting portions carrying the various shafts and other parts of the machine hereinafter mentioned.

The belt 220 running over a pulley 230 on a shaft 231, brings the carriers to the upper end of the machine onto a chute 232, carried between two of the vertical members of the frame and drops the carriers onto a conveyer belt 233. This belt 233 runs over pulleys 234 and pulleys 235 running on shafts 237 and 238 respectively. As shown, the shaft 237 has a bearing at each end in vertical members 240 secured to the cross members of the frame. The shaft 238 is carried between the ends of projecting arms 242, from which extend upwardly vertical members 243, secured at their upper ends to arms 244 carrying the shaft 231 heretofore mentioned. The carriers on falling onto the chute 232, are brought to the belt 233, to face upwardly, with the letter L in such a position that it is necessary to invert the carriers so that they will be in the proper position, before placing them into the chain mechanism which serves as a magazine for the unclassified letters, and which is hereinafter described. Accordingly, I provide curved or hooked portions 247 of rails 248. These curved portions correspond to the hooked rails or guides 176 of the keyboard machine and are adapted to engage first the ears 11 of the carrier at their under curved surface, and then the ears 12 at their upper curved surface. The rails 248 extend laterally partly through the machine and are carried by the vertical members of the frame, and being curved downwardly at 250, so that carriers sliding off from the rail portion 248 may be brought into proper position to enter the propelling chains 252.

The propelling chains comprise two endless chain members mounted on sprocket wheels 253, and 254, carried on shafts 256 and 258 respectively, and adapted to be driven by a pulley 259 on the end of the shaft 258, over which runs a belt 260 driven by a suitable motor 262. The shafts 256 and 258, are each suitably carried by the vertical members of the machine. These chains are preferably sprocket chains having flat side links carrying inwardly projecting wings 264. These wings are adapted to engage the ears 11 of the carriers to propel them transversely and in succession past the selector device, hereinafter described.

The carriers are loaded into the chain or propelling mechanism with the ears (11) engaging the various wings 264, and are then propelled past selector bars 266 hereinafter described. The carriers are retained in engagement with these wings which in effect form pockets opening inwardly, upwardly and downwardly, by means of guideways or rails 270, under either chain and extending around the sprockets 253 and 254. The carriers are so held that they project outwardly from the propelling chain, as shown in Figs. 17 and 26. At the under side of the lower reach of the chain, the supports 270 are cut away or spread as at 271, and 272, Fig. 22, forming a gap through which the carriers having the proper combinations of the positions of the slides to be selected are allowed to drop.

The carriers thus selected are dropped, and impinge a deflector plate or short chute 273 carried by the frame of the machine. This brings them onto a belt 275 running (in the direction of the arrows), over suitable pulleys 276 and 277 carried on suitable shafts 278 and 279 respectively. These shafts are carried on short arms 280 and 281, of the frame. This belt is propelled by a belt 282 running on a suitable pulley on the end of the shaft 279 and over a driving pulley 283. The carriers are laid on this belt 275 in the position shown, and they are removed therefrom by hooked portions 284 of the rails 285, thus inverting the carrier as described in connection with the rails 248. The carriers move along these rails with their ears 11 engaging them and are propelled along the same by means of projections 286, carried on suitable chain 288, so positioned that they engage the ears of the carriers to move them along these rails. On one of these rails is a projection indicated at 289, which is adapted to engage the arm 47 of the gripper release of the letters. A brush 290, preferably having flexible wings is carried by arms 291 on the frame and brushes the letters down to a short chute 292 where they fall into a suitable receptacle 294. Here the letters 287 are stacked by a second brush 293, as shown.

The chain 288 runs over suitable sprockets 295 carried by arms 296 of the frame of the machine and then upwardly and over a sprocket 297, carried by the shaft 238, heretofore mentioned. The projections on the chain 288 are so arranged that they engage the ears of the carriers as they slide off from the curved surface of the hooked portions 284 of the rail 285, and a curved guide 300, pivoted at 301 is adapted to hold these carriers in engagement with the projections 286 until the projections holding a carrier start upwardly and assume an angle which causes them to retain the carriers. These empty carriers are thereby brought upwardly and over the pulley 235 onto the belt 233, where they pass beneath the short chute 232 and onto the rails 248. This provides for bringing the empty carriers back into the chain 252, so that they may be in effect stored here, until it is desired to convey them back to the loading mechanism. The slidable plate 23 of the carrier is pressed inwardly by means of a projection 310 carried by one of the rails 285, engaging the lip or projection 29 on the plate 23, allowing the slides to move to their upper position as heretofore described. Accordingly, all the carriers carried up by the belt 288 and back into the propelling chains have their slides set in their first position, which setting may be referred to as zero, for it is preferable not to have any route corresponding to it. To bring these carriers back to the loading mechanism, it is only necessary to set the selector bars to discharge these carriers and move the curved guides 300 on the pivots 301, to allow the carriers to drop onto the rails 305, thereby bringing them onto a deflector plate 306 and then onto the belt 138, from which they are brought upwardly to the loading mechanism by the chains 135, as heretofore described. This belt is shown as running beneath the keyboard mechanism and being guided over pulleys 307 and 308. The pulley 308 is driven by a chain 309 running over a suitable sprocket on the shaft 86, heretofore mentioned.

The carriers on the rails 248 are bunched or grouped at the beginning of the downwardly curved portion 250, as indicated at 312, and they are prevented from sliding down this portion, except when desired, by means of a hook 313 pivoted at the curved portion 250 of one of the rails 248, and operated by a link 314 connected at its lower end with an arm 316. This arm is pivoted on a portion of the frame at 317, and comprises a portion of a feeler lever having a surface 318 standing adjacent the chains 252 and adapted to engage the under side of the ears of the carriers and be moved upwardly by means of a spring 319. Wherever in the propelling chains there are enough successive empty wing pockets to allow the upward movement of the portions 318—the spring 319 pulls downwardly on the link 314 drawing downwardly on the catch 313 and discharging a number of the carriers which slide off from the curved rails 250 and come into the chain between the wings, as heretofore described.

In order to group or compact the carriers in the chain, after a number of them have been discharged, and close up the spaces between the carriers, it is necessary to remove the carriers from the chain and put them in again in succession in contiguous positions. To remove the carriers from the chain and replace them in contiguous positions, I provide cams 320, standing between the wings of the chains and engaging the lower edge of the carriers, raising them free of the wings. Above these cams 320, are similarly shaped cam rails 322, carried by the frame of the machine and adapted to engage the ears of the carriers. These rails 322 support the carriers above the wings of the chain, and the carriers are pushed along the rails and off from the ends 323, dropping again into the propelling chains in contiguous positions. The thickness of these carriers, including the buttons or T-heads 50, is substantially equal to the spacing of the wings on the propeller chains, which causes them to be properly positioned in the chains.

At various points along the chain, I provide pushers in the form of projecting fingers 325 (Fig. 18), so shaped that they pass the rail 320 and curve inwardly at their outer ends to engage the intermediate portion of the carriers. These fingers coming to the upper reach of the belt push the carriers grouped on the rails 322 off from the ends 323 and into the chain, so that behind each of these fingers is an empty space in the chains to which the feeler lever 318 responds, discharging carriers from the rails 248 and thereby keeping the chain substantially full of carriers.

A belt 327 carried on pulleys 328 and 329 having their shafts suitably supported by the frame of the machine, is propelled by a chain 330 running over a sprocket 331 and over a sprocket 333 on the shaft 237. The upper reach of this belt is adapted to frictionally engage the lower edge of the carriers, thereby propelling them along the rails 248 and grouping or bunching them at 312 as heretofore described.

As shown, the belt 220, is propelled by a chain 335 on suitable sprockets carried by the shafts 231 and 238, the shafts 238 being propelled by the chain 288 which is in turn driven by a chain 237 running over a suitable sprocket on the shaft 256 and over a second sprocket on the shaft of the adjacent sprockets 295. The chain 288 thereby rotates the shaft 238, and drives the belt 233 and 327 through the connections described.

As heretofore stated, the carriers are removed from the propelling chain by providing a gap in the supporting strips 270 and bridging this gap with settable bars having supporting surfaces co-acting with the projections 20 on the slides, some of these surfaces being discontinued above the gap so that carriers having a certain setting will fall through the gap, while all others are carried across. Any convenient arrangement of supporting surfaces co-acting with the settable feature of the carrier may be provided to accomplish this result.

As shown, the selector bars 266 are each provided with two pairs of parallel longitudinal ribs 267 and 268. The ribs 267 extend throughout the length of the bars 266 and all carriers having their slides in such positions that the projections 20 get above either of these pairs of ribs, are carried entirely across the gap 271, while those carriers having their slides so set that their projections engage the lower pairs of ribs 268 are carried to a point above the gap where the ribs 268 are discontinued, allowing the carriers to drop through. With the arrangement shown, each pair of the ribs 268 and 268$^a$ always engage the projections of the slides of the carriers which are to be selected. Those not engaging both pairs of these ribs drop below the bars before reaching the gap and are carried across it by means of the undercut portion 13 of one ear of the carrier engaging and sliding on the edge and side of a rail 344. This rail is bent outwardly as at 345, and then inwardly again at 346, and then leads upwardly again to the guideway 270. This offset portion 272 of the rail 344, allows the selected carriers to miss this rail when dropped, but supports the carriers having their slides too low to engage the selector bars, while they pass the gap. The rail 344 is cut downwardly as shown, low enough to allow the carriers to pass beneath the selector bars in their lowest position, but the ears of the carriers are still engaged and propelled by the wings of the chain as shown in Fig. 26. The supporting rail 270 beneath the opposite chain is cut downwardly as shown at 348, and adjacent the gap 271 it is turned downwardly as at 347, to provide for the carriers supported by the rail 344 sliding smoothly up onto the support 270, after crossing the gap.

The carriers are prevented from tilting when supported by the projections of only one slide, by the upper surfaces of these projections engaging the under surfaces of the ribs next above the ones supporting a carrier. Accordingly, to prevent carriers supported by either of the pairs of ribs 267 from tilting, I may provide additional pairs of ribs above these ribs 267 on each bar.

To set the selector bars 266 in their various positions corresponding to a desired combination, vertically extending rods 352 supporting these bars are slidably mounted in frame members 354 and 355 carried by the cross members 228 of the frame of the machine, and these rods have laterally projecting blocks 356 engaging the upper edges of slide bars 357. These bars are slidably carried by the frame members 354 and 355 and at one side of the frame each pair of bars, adapted to raise and lower each selector, is connected by a cross member 358, on each of which is mounted a handle 359.

The rods 352 are normally pressed downwardly, holding the blocks 356 into contact with the upper edge of the bars 357 by means of spiral springs 360, surrounding these bars and interposed between the upper members of the frame and a pin or collar, as indicated at 361. The upper edges of these slide bars 357 are provided with steps giving relative heights, these steps being connected by sloping or cam portions 362, allowing these bars to be slid inwardly and outwardly beneath the blocks 356, so that when the bars are pushed inwardly, the blocks 356 and the rods 352 are raised, thereby relatively raising the selector bars 266, to set them for different combinations of positions.

To determine the relative position of the selector bars, and to conveniently set the combination desired, I provide members on the sides of the bars 357, which may be seen through a slot 364 in a plate 365 carried by the frame member 354. As shown the numbers two and three may be seen through the slot, which indicates that the key bar at the left, the one supported by the upper bars 357, is in its lowest or third position, while the lower one, controlling the other selector bar is in its second or intermediate position.

The operation of these selector bars is as follows: Suppose that the bars were positioned as shown in Fig. 19, to select carriers having the slide at the right in the third or lowest position, and the slide to the left, in the second or intermediate position, then carriers would be moved along the guides 270, as indicated in dot and dash lines at 353 Fig. 25, and brought onto the selector bars. The carriers having their slides in positions corresponding to the positions of the ribs 268 and 268ª of the bars, would be supported by the bars. The projections 20 of the slide at the left engage first the ribs 268ª—which are discontinued before reaching the gap, but which extend past the ends of the ribs 268, or in effect overlap them—then before coming to the end of the ribs 268ª, the other slide engages the ribs 268 of the other selector bar, thereby bringing the carrier to the gap, through which it is dropped, as indicated in dot and dash lines at 349. The carriers having their slides in higher positions would engage either one or the other of the pairs of ribs 267, as indicated at 350, and would be carried across the gap, dropping again onto the supports 270. Carriers having their slides set in positions too low to get on the ribs 267 and having only one slide in position to engage the ribs 268 or 268ª, would be dropped either at the end of the ribs 268ª and the undercut portion of the ear 11 would engage the rail 344 and be carried around the gap as heretofore described, or would drop without engaging the ribs of either bar, as indicated at 351. In case neither of the selector bars were in the lowest position, carriers might have both slides set below the ribs of the bars, and they would then drop as at 351 without engaging the ribs of either bar.

It is necessary that there be no carriers on the selector bars at the time they are moved for setting, accordingly I provide a place in the chain 252 in which there are no wings 264 to receive the carriers, and I prevent carriers being dropped onto this portion of the chain by means of small projections or fingers carried by the chain and adapted to engage the feeler lever to hold the same in its normal position while this portion of the chain passes it. The machine may be automatically stopped with the vacant portion of the chain opposite the selector bars, by any suitable means, as by a cam lever 377, pivoted at 378 and having a cam portion 390, normally pressed into engagement with the ears of the carriers by means of a spring 391. Connected with this lever is the blade of an electric switch 392, connected by wires 393 with the motor 262, so that when the cam portion of the lever 390 comes opposite the vacant portion of the chain where it does not engage the wings 264, the spring acts to throw out the switch 392, thereby stopping the motor 262. After the carriers have been set, this switch may be again moved to close the circuit and start the motor automatically, or may be moved by hand by grasping either the blade of the switch or the lever 377.

My invention as thus far described, comprises one loader, one keyboard mechanism for one operator and one selecting machine, and although such an apparatus is efficient and rapid in operation, the limit of speed at which the letters may be classified is the speed at which the operator at the keyboard can read the addresses. Accordingly, to reduce this limitation to a minimum, or in other words to equalize the capacity of the elements of my apparatus, I provide a compound keyboard mechanism, allowing several keyboard operators to read addresses and discharge mail to the selecting mechanism at one time. Such an arrangement of the keyboard mechanism is shown diagrammatically in Fig. 27, as heretofore mentioned, and the details of conveyer mechanism for the same are shown in Figs. 29 to 32 inclusive. In these figures 1, 2ª and 3 indicate the loading mechanism, the keyboard mechanisms and the selecting mechanism respectively, and connected by suitable conveyers 5, as described.

As shown, the compound keyboard mechanism comprises a suitable number of machines, being mounted in separate frames provided with the keys 162ª and having guideways 183ª, to bring the carriers into the reading position in front of the operator, from which position the carriers are discharged onto the conveyer belts 208ª. Each of these belts discharges the carriers onto the next belt to the right, and the last belt to the right brings the carriers onto the conveyer belt 220ª, leading to the selecting mechanism.

A suitable mechanism for taking the carriers from the conveyer belt 78ª and distributing them equally to each reading position of the compound keyboard mechanism, comprises hooked rails 176ª extending over the pulley 164ª, over which the belt 78ª runs. These hooks have downwardly extending rails 398 turned forwardly as at 399 to bring the carriers into position to have their ears engaged by pairs of worm screw propelling members 400 and 402. As shown, threads or spiral wings of the upper pair 400, are adapted to engage the ears 12 of the carriers, and those of the lower pair 402 engage the ears 11 of the carriers. These screw propelling members are suitably driven to move the carriers along a trackway comprising rails 404 having a series of gaps 405, over each of the chutes 180ª.

The screws may be driven by a sprocket 406 on the shaft 165ª over which runs a sprocket chain 407, driving a sprocket 408, on a shaft 410. On this shaft 410 are suitable bevel gears 411, meshing the pinions 412, on the screw members 402, which may be suitably journaled at this end in bearings 413, and at their opposite ends in bearing members 414, suspended from a suitable support, not shown. Adjacent these bearings are provided sprockets on the screw members, over which run suitable sprocket chains 415, driving the upper screw members by the lower ones, in the proper direction.

The gaps 405 are closed by means of suitable gate members 417, 418, 419 and 420, which are carried on slidable rods 422, each having one end engaging a cam 423 on a shaft 424, driven by a sprocket 425, which in turn is driven by a suitable sprocket chain 426, running over a sprocket on the shaft 165ª. The shafts 165ª, 410 and 424, are shown as suitably carried by upright frame members 167ª. These rods 422 are slidably carried by suitable brackets 428 and 429, and attached to each of the brackets 429 is one end of a spring 430, having its other end secured to a depending finger 431, each rigid on the slidable member, and tending to draw it toward the left.

The gates carried by the slidable rods are so mounted that as the rods are moved in one direction each of the gaps 405 is successively opened and closed. Fig. 28 shows the gate 420 in its open position, allowing the carriers to drop through into the chute 180ª, at the right. On the further movement of the cams 423, the springs 430 will move the rods to the left, moving the gate 420 to a closed position and the gate 418 to an open position, and a still further movement of the cam moves the rods to the left, bringing the gate 417 to an open position. A return portion of the cam then moves the rod to the right, bringing the gate 420 again to an open position. In order to prevent the intermediate gap being opened on this return movement, the gate 419 is made slidable on the rods and is moved by collars 433, so spaced apart as to allow an idle movement on the rods. The upper face of the gate 419, frictionally engaging the lower side of the rails 404, allows the gate 418 to move away from the gate 419, when the rods are being moved toward the left, thus providing for opening the intermediate gap and on the further movement one of the collars causes this gate to close the gap while the gate 417 opens its gap; but on the return movement of the rod, the gate 419 fits against the gate 418, thus keeping the gap closed.

The ends of the portions of the rails 404 adjacent the gaps are rounded as shown, which provides for the carriers riding smoothly across the gaps, and in case carriers should come to the end of the propelling screws, not having been dropped through a gap, I provide an "over-flow" receptacle 435, into which such carriers would be dropped. The relative speed of the propelling screws and the rotation of the cams 423, is such that the carriers are evenly distributed to the various reading positions from which they may be discharged by the depression of the keys 162ª, as heretofore described, onto the belts 208ª. The gates are made adjustable on the slidable rods, so that they may be set in position to hold their respective gaps closed regardless of the movement of the rods. This allows one or more of the keyboards to remain idle while the others are being operated.

In using the compound keyboard I prefer to bring the guideways 184, for the carriers, downwardly, and over the belts 208ª, instead of using the two chutes 205 and 206. The lower ends 436 of these guideways may be properly curved to bring the carrier in the desired position over these conveyer belts. To prevent the carriers discharged from the reading positions at the right coming on top of those carriers discharged from the reading positions on the left, the carriers are brought from one belt onto another by means of hooked rails 438, along which they are moved by engagement with the belt as shown in Fig. 32, and carriers dropped from either of the guideway portions 436, at the right, depress a lever 440, having a projection 441, which engages any carrier on the rails 438. A carrier thus depressing one of these levers is shown at 442, Fig. 32. As soon as a carrier slides off from a lever 440, a spring 443 moves the lever upwardly, allowing any carriers on the rails 438, stopped thereby, to pass along. These belts may be suitably driven one by the other, and in proper relation to each other, by means of sprocket chains 445, running over suitable sprockets on the shafts of the pulleys of these belts, and the last of the belts at the right may be driven by the belt 220$^a$, as described in connection with the belts 220 and 208.

It will be seen from the foregoing description that I have provided a mail selecting and classifying apparatus which is highly efficient and very rapid in operation and that my machine has many other desirable features. It may be readily adapted for classifying various sized parcels, from thin post cards to heavy mail matter, as well as various other kinds of articles having distinguishing characteristics. The capacity of my machine may be very greatly increased by providing a plurality of loops in the propelling chain of the selecting mechanism, and still further increased by providing several banks of these loops adapted to operate in connection with selector bars adapted to be set simultaneously. A corresponding number of operators may be provided for in the keyboard mechanisms, and a suitable number of loading mechanisms may be used, so that the capacity of these various machines will be relatively equal.

Having thus described my invention, what I claim is:

1. In a selecting system, the combination of a conveyer, carriers movable along the conveyer, settable mechanism on said carriers, keyboard-controlled mechanism independent of the carriers for setting said settable mechanism, means on each carrier for holding a piece of mail matter, means adapted to coöperate with the settable feature on the carrier enabling the carriers having a certain setting to be removed from the conveyer while others not having such a setting are carried along.

2. In a selecting system, the combination of a carrier, settable mechanism on said carrier, a keyboard independent of said carrier, and mechanism controlled thereby for setting said settable mechanism on the carrier, means on the carrier for holding a piece of mail matter, and a support adapted to coöperate with the different settings of settable mechanism on the carriers allowing the carriers having a certain setting to be removed therefrom while others not having such a setting remain on such support.

3. In a selecting system, the combination of a carrier, a settable feature on said carrier, a keyboard independent of said carrier for setting such feature, and a support along which the carriers are moved, mechanism for positioning the support, said support being adapted to coöperate with the settable feature on the carrier while in different positions causing carriers having a certain setting to be removed from the support while others not having such a setting are carried along such support.

4. In a selecting system, the combination of a series of carriers each having a settable feature, a trackway, means for propelling the carriers along the same, means for loading the carriers, mechanism past which the carriers are moved, said mechanism being adapted to coöperate with the settable feature on the carrier causing carriers having a certain setting to be removed while others not having such a setting are carried along, and means for discharging the loads from removed carriers.

5. In a mail selecting system, the combination of a series of carriers for articles of mail, means for loading them and for propelling them, a support along which such carriers are adapted to move having a series of longitudinal supporting surfaces, settable mechanism on the carriers adapted to coöperate with such supporting surfaces whereby carriers having a certain setting may be removed from such support, means for discharging mail from removed carriers, a keyboard, and mechanism controlled thereby for setting the mechanism on the carriers.

6. In a mail selecting system, the combination of a carrier for articles of mail, a support along which such carriers are adapted to move having a series of longitudinal supporting surfaces, alterable mechanism on the carrier adapted to coöperate with such supporting surfaces whereby carriers having a certain setting may be removed from such support, and separate manually controlled means adapted to alter said alterable mechanism on the carrier.

7. In a mail selecting system, the combination of a carrier for articles of mail, a support along which such carriers are adapted to move having a series of longitudinal supporting surfaces, settable mechanism on the carrier adapted to coöperate with such supporting surfaces whereby carriers having a certain setting may be removed from such support, and means for discharging the contents of the carriers consequent upon their removal.

8. In a mail selecting system, the combination of a carrier for articles of mail, a support along which such carriers are adapted to move having a series of longitudinal supporting surfaces, settable mechanism on the carriers adapted to coöperate in different positions with such supporting surfaces, and a keyboard controlled mechanism independent of the carriers for setting the mechanism on the carrier.

9. In a mail selecting system, the combination of a series of carriers for articles of mail, a support across which such carriers are adapted to move having a series of longitudinal supporting surfaces, settable mechanism on each carrier adapted to coöperate with such supporting surfaces, keyboard controlled mechanism for setting the mechanism on the carrier, and means for propelling the carriers past the keyboard mechanism and support.

10. In a selecting system, the combination of a carrier, a settable feature on said carrier, a keyboard for setting such feature, a support across which the carriers are moved having a settable feature, said support adapted to coöperate with the settable feature on the carrier causing carriers having a certain setting to be removed from the support while others not having such a setting are carried across such support, a clamp on each carrier for mail matter, and means for automatically opening said clamps on the removed carriers.

11. In a selecting system, the combination of a carrier for articles of mail, a guideway along which such carriers are adapted to move, a portion of such guideway having settable supporting surfaces, alterable mechanism on the carrier adapted to coöperate with such supporting surfaces whereby carriers having certain setting are removed from such support and mechanism for altering the supporting surfaces.

12. In a selecting system, the combination of a series of carriers, settable mechanism on the carriers, mechanism independent of the carriers for setting such mechanism, a member across which such carriers are adapted to move having a plurality of longitudinal surfaces coacting with different settings of the settable mechanism on the carriers whereby carriers having a certain setting may be separated from said member.

13. In a selecting system, the combination of a series of carriers for mail matter, settable mechanism on each carrier, a settable rail having a plurality of longitudinal supporting surfaces co-acting with the settable mechanism of the carriers, a support adjacent said rail and having a gap opposite the rail, means for moving the carriers along the guideway and across said rail whereby the settable mechanism of the carrier may co-act with the supporting surfaces of the rail to allow carriers having a certain setting to be removed from the rail at the gap.

14. In a mail selecting system, the combination of a series of carriers for individual pieces of mail matter, mechanism on each carrier adapted to be set according to the address on a piece of mail matter, a bar having a plurality of longitudinal supporting surfaces co-acting with the settable mechansm of the carriers, a support adjacent said bar and having a gap opposite the bar, means for moving the carriers along the support and across said bar whereby the settable mechanism of the carrier may co-act with the supporting surfaces of the bar at the gap to allow carriers having a certain setting to be separated therefrom at the gap.

15. In a mail selecting system, the combination of a guideway having a gap, a series of carriers for the articles of mail adapted to move along said guideway and each having a settable feature, a device bridging said gap adapted to be set in various positions corresponding to certain addresses of mail and adapted to co-act with the settable feature of the carrier whereby carriers having said settable feature in a certain position are removed from the guideway at such device.

16. In a mail selecting system, the combination of a guideway having a gap, a carrier for the articles of mail adapted to move along said guideway and having a settable feature, a discharge device bridging said gap comprising a plurality of members adapted to be set in various relative positions, whereby the number of possible settings is greater than the number of members, said discharge device being adapted to coact with the settable feature of the carrier to discharge all carriers having a certain setting.

17. In a selecting system the combination of a series of carriers for individual pieces, mechanism on each carrier adapted to be set, and a projecting portion on the carrier, a guideway engaging said projecting portion to support the carrier, means for propelling the carrier along this guideway, a portion of the guideway extending outwardly and then inwardly, a bar opposite said outwardly leading portion adapted to co-act with the settable mechanism on the carrier whereby carriers having a certain setting may be removed from the guideway at the point opposite the outwardly leading portion.

18. In a selecting system, the combination of a series of carriers for individual articles, settable mechanism on each carrier and a projection on each carrier by which it is supported, a guideway co-acting with said projection, means for propelling the carriers along the guideway, a portion of said guideway being lower than the remaining portion and leading outwardly and then inwardly again, a settable bridge member supporting the carriers opposite this lower portion adapted to coöperate with said settable mechanism on the carrier and support the carriers opposite said lower portion of the guideway whereby the carriers having certain setting are carried across the outwardly extending portion, others are removed from the guideway through the outwardly extending portion and others not engaging the bridge ride past the same on the guideway.

19. In a selecting system, the combination of a series of carriers for individual pieces, settable mechanism on each carrier, a hooked projection on each side of the carrier, a guideway having strips engaging these projections, a gap in one of these, the general level of said strips being lower adjacent this gap, one of the strips having a rail-like portion engaging the carrier adapted to support the carrier independently of the other strip, means for propelling the carriers along the strips, selector bars bridging the gap and having supporting surfaces coöperating with the settable mechanism of the carrier, an offset portion in the rail-like portion of the guideway, certain of said supporting surfaces being discontinued opposite the offset portion whereby carriers having a certain setting may be dropped from the guideway through the gap at the offset portion, others may be carried across the gap by the bars, and others having still other settings may be carried around the gap by said rail engaging the hooked portion of the carrier.

20. In a mail selecting system, the combination of carriers for individual pieces of mail, a means for loading the mail into the carriers, a guideway for said carriers, a keyboard adjacent said guideway, settable mechanism on the carriers, means operated by the keys for setting the mechanism on the carriers, and a selective device adapted to remove carriers having a certain setting from the general group according to the setting of said mechanism on the carriers.

21. In a mail selecting apparatus, the combination of a series of carriers each having a settable feature thereon, means for loading individual articles of mail into said carriers, a guideway for said carriers, a keyboard adjacent said guideway, means operated by the keys for positioning the settable feature on the carrier according to the address of the mail matter carried thereby, and a discharging device having a settable feature adapted to co-act with the settable feature of the carrier whereby the carriers are removed from the guideway or retained on the same according to the relative positioning of the settable feature.

22. In a mail selecting system, the combination of carriers for the articles of mail each of said carriers having a settable feature, a guideway for the carriers, means for moving them along the same, a keyboard, a means for stopping a plurality of carriers opposite the keyboard, means operated by the keys of the keyboard for setting the settable feature of the carrier, and a discharge device coöperating with said settable feature adapted to remove the carriers from the guideway according to the setting.

23. In a selecting system, the combination of carriers each having a settable feature, a guideway for the carriers, means for moving them along the same, a keyboard adjacent the guideway, means for bringing a plurality of carriers into the view of an operator at the keyboard, means whereby each key of the keyboard may differentially position the settable feature of the carrier, and a discharge device adapted to remove the carriers from the guideway or retain them according to the position of said settable feature on the carrier.

24. In a selecting system, the combination of a series of carriers for individual articles having a distinguishing characteristic, settable mechanism on said carriers, a guideway for said carriers, a portion of said guideway being substantially vertical so that a number of carriers may be grouped in this vertical portion, a keyboard adjacent said vertical guideway so positioned that an operator at said keyboard may inspect the articles on the carriers, and mechanism whereby each key of the keyboard may act to set the mechanism on the carrier.

25. In a mail selecting system, the combination of a series of carriers for the individual pieces of mail, each having settable mechanism, a guideway for said carriers, projecting portions on said carriers, a portion of said guideway adapted to engage said projections and bring a number of the carriers into a vertical column, mechanism operated by the keys adapted to set the mechanism on the carriers corresponding to the address of the mail carried thereby, means for stopping the carriers in the vertical column, and mechanism controlled by each key for releasing a carrier which has been set.

26. In a mail selecting system, the combination of a guideway, a series of carriers for the individual pieces of mail having a settable feature, a keyboard adjacent said guideway, a portion of said guideway adjacent the keyboard being adapted to bring a plurality of carriers in a position to be read by the keyboard operator, and means controlled by keys for setting the mechanism on the carrier according to the address of the mail matter carried thereby and for permitting carriers which have been set to move on, and a selecting mechanism for thereafter removing the carriers from the guideway according to their setting.

27. In a mail classifying system, the combination of a guideway, a series of carriers adapted to travel along the same, spring clamps on these carriers adapted to grip a piece of mail matter, a means for opening said clamp having a projecting portion, a cam along the guideway adapted to coact therewith to release the letter, movable members on the carrier, means for holding said members in given positions, a projecting member adapted to release said last named means, and selecting mechanism adapted to coöperate with said settable mechanism.

28. In a classifying system, the combination of a series of carriers, a means for securing a piece of mail matter to each carrier, a plurality of slides having projections, means for holding these slides mounted on the carriers and in various combinations of relative positions, means acting on said last mentioned means to release the slides, springs acting on the slides to return them to their normal position, and selecting mechanism coacting with the slides.

29. In a mail classifying system, the combination of a series of carriers for the mail matter, each carrier comprising a flat member, a spring clamp adapted to hold a letter to said flat member, lateral projections, a guideway coacting with the lateral projections, slides on the carrier, means for holding the slides in various combinations of relative positions, means for releasing the slides, springs for returning them to their normal positions, means adjacent the guideway coöperating with said releasing means, and selecting mechanism coacting with different settings of the slides.

30. In a selecting system, the combination of a guideway comprising endless moving conveyers, parallel rails and slotted guides, a flat carrier for the individual pieces of mail adapted to lie on said conveyers having lateral projections adapted to engage said rails and having other projections adapted to coact with the slotted guides, and means on the carrier for holding a piece of mail matter.

31. In a mail selecting system, the combination of a series of carriers having clamps thereon adapted to engage a piece of mail matter, mechanism on the carriers adapted to be set according to the address on said piece of mail matter, raised heads or buttons carried by one side of the carrier, a guideway having T-slots coacting with said raised heads, and setting mechanism adjacent the guideway coöperating with the mechanism on the carrier.

32. In a mail selecting system, the combination of a series of free carriers, grippers on said carriers for gripping a piece of mail matter, a guideway for said carriers, means adjacent said guideway for feeding letters one by one, means for bringing a carrier into position to receive a letter, and means for momentarily opening the grippers on said carriers.

33. In a selecting system, the combination of a guideway, a series of carriers adapted to travel along the same and having settable mechanism, a loading mechanism adapted to feed the pieces of mail matter one by one to the carriers, means on the carriers for gripping said mail matter, means on said loading mechanism for momentarily opening said grippers and thereafter releasing the carrier, mechanism for setting the settable mechanism on the carriers, and mechanism coöperating therewith for removing the carriers from the guideway according to said setting.

34. In a mail selecting system, the combination of a guideway, a carrier adapted to move along the same, means on the carrier for gripping an individual piece of mail, means for feeding mail to the carrier, means for opening the grippers to receive the mail thereafter allowing the closing of the same, a settable feature on the carrier, a keyboard controlling the setting of said feature, and mechanism for thereafter removing the carrier from the guideway according to the setting of said feature.

35. In a mail selecting system, the combination of a guideway, a carrier adapted to move along the same having settable mechanism thereon, a keyboard adjacent said guideway for setting said mechanism, and a selecting device having settable mechanism coöperating with the mechanism on the carrier to remove carriers from the guideway according to their setting.

36. In a mail selecting system, the combination of carriers for the mail matter having a characteristic feature, a guideway for the carriers, a settable discharge mechanism in said guideway adapted to coact with the different characteristic features of the carriers, mechanism for resetting said discharge mechanism, means for propelling the carriers along said guideway whereby carriers having a certain characteristic may be selected from others, and means for discharging the contents of such selected carriers.

37. In a mail selecting system, the combination of a guideway, a plurality of carriers adapted to move along the same and having a distinguishing mechanism thereon, means for loading the carriers with the mail matter, a discharge device in said guideway adapted to coact with the characteristic mechanism of the carriers and adapted to be set to remove carriers according to the address on the mail carried thereby, and means for discharging the mail from the removed carriers.

38. In a mail classifying system, the combination with a plurality of pieces of mail matter, of a magazine therefor, means for associating an automatically-controlling record with each piece of mail corresponding to its destination, and variable discharging means adapted to coöperate with such automatic records, means for causing transitive changes in the discharging means, whereby pieces of mail of a given destination can be selected at intermediate locations of a general mass and separated therefrom and removed from the magazine.

39. In a mail selecting system, the combination of a plurality of carriers for individual pieces of mail matter, each carrier having a distinguishing characteristic, a guideway along which said carriers are adapted to move, a gap in said guideway, and settable members bridging said gap adapted to coact with the distinguishing characteristic of the carrier to remove the carriers from the guideway according to the address on the mail carried thereby, and mechanism controlling said members.

40. In a mail selecting system, the combination of a plurality of carriers for individual pieces of mail matter, each carrier having a distinguishing characteristic, a guideway along which said carriers are adapted to move, a manually controlled means for determining the characteristic associated with each piece of mail matter, a gap in said guideway, resettable members bridging said gap adapted to coact with the distinguishing characteristic of the carrier to remove the carriers from the guideway according to the address on the mail carried thereby, and means for resetting said members whereby the operator is enabled to set the machine to cause it to select carriers carrying mail with predetermined addresses.

41. In a selecting system, the combination of a carrier for the individual pieces of mail matter, a mechanism for loading mail into the carriers, said carriers having a settable feature, a keyboard mechanism co-acting with said settable feature, a selecting mechanism co-acting with said settable feature, conveyers connecting each of said mechanisms, and endless conveyers adapted to move the carriers past the selecting mechanism, and means for taking the carriers from the first mentioned conveyer and putting them into the last mentioned conveyer.

42. In a selecting system, the combination of a guideway, a carrier adapted to move along the same and having a settable feature, a discharge device having a feature settable according to the class characteristic of the article carried and adapted to co-act with the settable feature of the carrier, and an endless propelling mechanism adjacent said discharge device adapted to move the carriers repeatedly past the same.

43. In a mail classifying system, the combination of free carriers for the pieces of mail, distinguishing characteristics on said carriers, a manually controlled means for associating with each piece of mail a mechanical characteristic corresponding to its route class, mechanism for thereafter coöperating with the distinguishing characteristic to separate the mail from the general group according to the address thereon, and endless conveyers for the carriers leading from the manually controlled means past the last mentioned mechanism to repeatedly present the general group automatically to said mechanism for separating various route classes.

44. In a mail selecting system, the combination of a plurality of free carriers, settable mechanism on each carrier, a guideway for the carriers, a keyboard mechanism adjacent said guideway adapted to set the mechanism on the carrier according to the address of the letter carried thereby, a selecting mechanism adapted to co-act with the settable mechanism of the carriers to discharge the same according to their settings, propelling mechanisms for moving the carriers past the selecting mechanism, and endless conveyer belts leading from the keyboard mechanism to the selecting mechanism.

45. In a selecting system, the combination of a plurality of free carriers having a distinguishing characteristic thereon, a settable selector device coöperating with the distinguishing characteristic, and propelling mechanism engaging the carriers to move them in an endless circuit past the selector device.

46. In a mail classifying system, the combination of means for providing pieces of mail matter with mechanical distinguishing characteristics, a plurality of manually operated mechanisms for controlling said means to determine the characteristics given according to the addresses on the pieces of mail matter, selecting means for selecting pieces from a group of pieces according to the characteristics thereon, and means for presenting the group repeatedly to said selecting means.

47. In a mail classifying system, the combination of means for associating with pieces of mail matter devices each having mechanical distinguishing characteristics, a magazine for containing the associated devices, means for selecting pieces from a group of pieces of mail matter in the magazine according to the characteristic thereon, and a plurality of controlling mechanisms whereby a number of operators may determine the characteristics on various pieces of mail according to the address thereon.

48. In a mail classifying system, the combination of mechanism for providing pieces of mail matter with mechanical distinguishing characteristics, means for selecting pieces from intermediate positions in a group of pieces according to the characteristics thereon including means for effecting a relative movement of the mail matter and selecting means, and a plurality of keyboards, means actuated thereby for controlling said mechanism for determining the characteristic on various pieces of mail matter.

49. In a mail classifying system, the combination of separate sets of mechanism for providing pieces of mail matter with mechanical distinguishing characteristics, means for presenting mail matter to such mechanisms, means for selecting pieces from a group of pieces according to the characteristic thereon, a plurality of keyboards controlling one of said mechanisms to determine the characteristic of various pieces of mail, and conveyer mechanism for taking the pieces of mail matter from said mechanisms to the selecting means, and for presenting the mechanical characteristics thereof repeatedly to said selecting means to arrange the mail according to the order of said characteristics.

50. In a mail classifying system, the combination of a plurality of free carriers adapted to hold pieces of mail matter, said carriers having a settable feature, a plurality of keyboard mechanisms adapted to set said feature according to the address on the mail carried thereby, conveyer mechanisms for discharging the carriers successively to said keyboard mechanisms, means for selecting the carriers from a general group according to their setting, and conveyer mechanisms for conveying the carriers from the keyboard mechanisms to said selecting mechanisms.

51. In a mail classifying system, the combination of a conveyer mechanism for the pieces of mail, a compound keyboard mechanism adapted for several operators, and means whereby the keyboards non-interferingly control the classification and delivery of each piece of mail through the same conveyer mechanism.

52. In a mail classifying system, the combination of a plurality of carriers for the individual pieces of mail each carrier having a settable feature, conveyer mechanism for said carriers adapted to apportion the mail among a plurality of reading positions, keyboard mechanisms opposite said reading positions adapted to set said feature on the carriers according to the address on the mail carried thereby, mechanism for selecting the carriers from a general group according to their setting, and conveyer mechanisms leading from the keyboard mechanisms to the selecting mechanism.

53. In a mail classifying system, the combination of a plurality of free carriers for the individual pieces of mail, each carrier having a settable feature, a plurality of keyboard-mechanisms for positioning said settable features, conveyer mechanism for moving the carriers into reading positions opposite said keyboards, and means for selecting the carriers from the general group according to their setting, and conveyer mechanism leading from the keyboards to said selecting mechanism.

54. In a mail classifying system, the combination of a plurality of carriers for the individual pieces of mail, a plurality of keyboard mechanisms, guideways for said carriers adapted to bring the mail matter into reading positions adjacent said keyboard mechanisms, conveyer belts leading from said reading positions, and means for preventing the carriers coming one on top of the other on said conveyer belts.

55. In a mail selecting system, the combination of a guideway, a carrier adapted to move along the same having settable mechanism thereon, means in said guideway for grouping the carriers in a plurality of separate groups with the mail matter thereon facing the same direction, a key board opposite each of the positions in which the carriers are grouped, and a selecting device having selecting mechanism coöperating with the settable mechanism on the carrier.

56. In a mail classifying system, the combination of a holder for mail matter, means for attaching to the individual letters devices having settable characteristics, a plurality of keyboards, mechanisms controlled thereby for setting such characteristics, means for presenting mail matter to the attaching means and to said mechanisms, whereby each piece of mail matter is provided with a mechanical record corresponding to its address, and a selecting device adapted to coact with each of the mechanical records to classify the pieces of mail.

57. The combination of a resettable mail selecting device, means for mechanically distinguishing the letters, a magazine to thereafter store letters unclassified in position to be acted on repeatedly by the selecting device, means for causing a relative movement of the letters in the magazine and the selecting device, and a continuously moving main letter conveyer arranged to discharge letters to said magazine.

58. The combination in a mail classifying system, of a classifying mechanism, a plurality of mail indexing stations, a series of independent carriers for the letters, a main letter conveyer arranged to receive the indexed letters in the carriers from said stations and discharge them into the classifying mechanism, and means adapted to deliver the mail from the several stations non-interferingly to said main letter conveyer.

59. The combination of a single discharge receptacle at which letters are delivered in classes and letter moving and controlling devices comprising a series of manually controlled movable elements and classifying devices coacting therewith, whereby each letter can be delivered at the discharge receptacle in any desired class.

60. In a mail classifying system, the combination of a unitary discharge station, an endless conveyer in proximity to said station, means to classify the letters, and means to deliver to said conveyer a group of letters in a particular class at said station.

61. In a mail classifying system, the combination of letter carriers characterized to correspond with classes of mail, carrier moving devices, a letter carrier selecting device adapted to coact selectively with said characterized carriers, manually operated actuating mechanisms corresponding to and indicating the aforesaid classes of mail respectively and operatively connected with and controlling said letter carrier selecting device.

62. In a mail classifying system, the combination of a plurality of detached independent letter carriers, propelling mechanisms therefor, controlling devices determining the particular class in which each letter is to be delivered, each of said devices governing various of the letters, a series of keyboard-controlled actuating means for said controlling devices with keys corresponding to and indicating said classes respectively.

63. In a mail classifying system, the combination of a series of banks of keyboard mechanisms, a main guideway, branch guideways leading therefrom past said banks of keyboard mechanisms, gates between the branch guideways and the main way, mechanical means controlling the letters, and means whereby said keyboard mechanisms may act on such means for letters delivered by said branch letterways.

64. In a mail classifying system, the combination with letters having mechanical distinguishing characteristics, of an endless guideway, means for circulating letters continuously around the same, a branch guideway, and mechanically controlled means coacting with all of said characteristics for diverting certain letters from the endless letterway to the branch letterway while allowing others to continue circulating on the endless letterway.

65. In a mail classifying system, the combination of letter carriers having directing means, a series of passages for the same, propelling means, and a keyboard independent of the carriers for setting said directing means, thereby controlling the course of said carriers in said passages.

66. In a mail classifying system, the combination of letter carriers, a discharge station, a series of passages communicating with said station, means for propelling the carriers in the passages, settable means on the carriers directing the course of the carriers in the passages, means coacting with said directing means for directing the carriers to the discharge station, and means for causing the carriers to discharge their contents at the said discharge station.

67. In a mail classifying system, the combination of a plate-like letter carrier having means for clamping a letter thereto and provided with projections adjacent to its lower edge, and a guideway adapted to sustain it in an inverted depending position by said projections.

68. In a mail classifying system, the combination of a flat carrier for letters provided with top and bottom lugs, a guideway having separated rails adapted to engage the top lugs and support the carrier in depending position, and certain other guideways having separated rails adapted to sustain it in an inverted position by the bottom lugs.

69. In a mail classifying system, the combination of a plurality of independent letter carriers, mechanism thereon for holding the letters, guide rails supporting the same, and parallel propelling chains each provided with wings to engage the adjacent edge of a carrier to move carriers extending across and depending between the chains, said wings engaging the edges of the carriers but avoiding said mechanism.

70. In a mail carrying system, the combination of a series of independent letter carriers each comprising a plate with projecting lugs and means to hold a letter against a face of the plate, and a conveyer having a pair of driving chains with wings to engage said lugs and thereby position the carriers, guide rails adapted to engage the lugs and support the carriers, said guide rails being provided with an opening through which the carriers may drop, and means for moving the chains.

71. In a mail classifying system, the combination of an independent removable letter carrier comprising a plate with means for clamping a letter against the face thereof, propelling means including a chain conveyer having members for holding the carriers substantially at right angles thereto and adapted to engage the letter carrier and propel it with its shortest dimension lying in the direction of travel, and a member past which the carriers are moved for opening the clamp to discharge the letter.

72. In a mail classifying system, the combination of a single discharge receptacle for classified mail, a series of conveyers finally discharging the mail to said station, and letter controlling mechanisms comprising settable carriers for the mail adapted to be carried by the conveyers and a coacting settable selector for controlling the discharge.

73. In a mail classifying system, the combination of a plurality of independent letter carriers each comprising a plate-like member with lugs projecting at its edges and with a clamp for holding a letter against the face of the carrier, a belt conveyer provided with specially arranged projections to engage and support the carrier when it is lying against the face of the belt, and rails adapted to engage said lugs and support the carrier, said rails being in position to receive the carriers from the belt.

74. In a mail classifying system, the combination of means for providing letters with a physical index in classes corresponding to their addresses, means for transporting said indexed letters, storing means receiving said indexed letters, and means for dividing said letters in the storing means by their indexes into aforementioned classes subsequent to and independent of the indexing operation.

75. In a mail classifying system, the combination of a plurality of sets of means for providing letters with a physical index in classes, means for transporting said indexed letters received from all said sets, means receiving the indexed letters from the transporting means for storing them, and means common to the other means for dividing said letters in the storing means according to their indexes into the aforementioned classes.

76. In a mail classifying system, the combination of means for classifying letters individually and attaching to them a mechanical index of the classification, means for moving said letters with their attached indexes to a common storage magazine, a single letter-receptacle, and mechanism for withdrawing the letters from the storage magazine in classes according to their indexes and discharging such classes successively into said receptacle.

77. In a mail classifying mechanism, the combination of a compartment constructed and arranged to receive and hold letters, means for giving each letter a mechanical distinguishing characteristic, a magazine, manually controlled mechanism coacting with said characteristic for withdrawing letters therefrom by classes, and means for delivering them to said compartment in separate and distinct classes of letters according to their addresses.

78. In a mail classifying system, the combination with a magazine, of means for storing therein mechanically characterized letters without regard to the order thereof, and mechanism adapted to coact with such characterization for selecting any desired class of letters from the magazine.

79. In a mail classifying system, the combination of a guideway, a plurality of free carriers for the letters adapted to be moved along said guideway, means for discharging letters from said carriers, and moving mechanism for receiving the letters so discharged and stacking them.

80. In a mail classifying system, the combination with letters having a characteristic receiving means, of a plurality of keyboard mechanisms coacting with said means and adapted to predetermine the delivery of letters of a class, and a classifying mechanism, of means whereby any keyboard may predetermine the delivery of a letter non-interferingly into a given class among the letters from others of said keyboards.

81. In a mail classifying system, the combination of a keyboard mechanism, a classifying mechanism independent of and distinct from the keyboard mechanism and constructed and arranged to classify letters delivered from the keyboard mechanism, independent settable carriers for the individual pieces of mail, and transporting devices adapted to carry individual articles of mail, said keyboard mechanism acting to set the carrier, and said classifying mechanism acting on the carrier to discharge said articles of mail, whereby the operation of said keyboard mechanism controls the discharge of said articles by the coaction of said classifying mechanism with said transporting device independently of the time of operation of the keyboard mechanism.

82. In a mail classifying system, the combination with means for attaching to individual letters independently-movable mechanically-indexible devices, keyboard-controlled means independent of said devices for indexing said devices, and means for classifying mail matter according to the indexing, whereby operation of the keyboard predetermines the class in which the letter will be delivered.

83. In a mail classifying system, the combination of an independently movable indexible device associated with a letter, and keyboard-controlled means independent of said devices for characterizing said device mechanically, and a settable selecting device coacting with said indexible device, whereby all the letters of a given class, as indexed by the keyboard, may be selected in direct succession by the selecting mechanism.

84. In a mail classifying system, the combination of means for attaching to letters independently-movable indexible devices, keyboard-controlled means independent of the devices for indexing said devices with respect to the route for the attached letters, and independent classifying mechanism settable to act differently on different indexes at various times, whereby the operation of the keyboard predetermines the classes of letters and the setting of the classifying mechanism determines the time of delivery of such letters.

85. In a mail classifying system, the combination with mail mechanically indexed as to classes, of means for delivering mail in a series of classes discharged successively at a terminal delivery receptacle, a set of discharge-controlling devices adapted to be set to correspond to and indicate said classes and coact with the mechanical indexes, and letter moving mechanisms enabling such coaction to discharge the letters of the class indicated by the setting of said controlling devices.

86. In a mail classifying system, letters mechanically indexed with regard to time of delivery, a magazine to contain the same arranged without regard to their indexing, means to select at appropriate periods letters of the corresponding time index, and propelling means for presenting the indexes to the selecting means.

87. In a mail classifying system, the combination with a unitary discharge station, of a conveyer for a plurality of letters having mechanical distinguishing features and adapted to circulate the same continuously past said discharge station, means coacting with said features for controlling the time of delivery of letters having the same feature from said conveyer at the discharge station, and manually operated mechanism controlling said means.

88. In a mail classifying system, the combination of a plurality of independently movable circulating carriers, settable indexes on said carriers, variable stroke reciprocating index setters arranged to determine the setting of said carrier indexes, and keyboard mechanism controlling said index setters.

89. In a mail classifying system, the combination of a magazine, means for discharging mechanically differentiated letters thereinto irrespective of the classifications of their differentiations, and means for discharging the letters therefrom class by class in succession according to the classification of their differentiations.

90. In a mail classifying system, the combination of means for mechanically differentiating letters, a magazine to hold mixed differentiated letters, letter propelling means, and settable mechanism coacting with differentiating characteristics of the letters and adapted to deliver from the magazine all of the letters with a given index at one setting of said mechanism.

91. In a mail classifying system, the combination of means for mechanically differentiating letters according to classes, a magazine to hold mixed letters, mechanisms coacting with the first mentioned means, and letter propelling means for causing such coaction, whereby the time of delivery of letters of a given class can be controlled.

92. In a mail classifying system, the combination with a supply of letters of a discharge station at which letters of various classes are to be delivered, means associating with each letter for mechanically determining the class in which it is to be delivered, and operator-controlled mechanisms including devices coacting with said means for selecting letters from the supply composed of several classes while leaving the balance of the supply intact and delivering such selected letters in classes to the discharge station, one class at a time.

93. In a mail classifying system, the combination of a magazine, means for propelling the letters in said magazine, mechanisms associated with each letter for determining the particular class of letters delivered at a given time by said letter propelling means, and manually operated controlling devices for and corresponding to said mechanisms and coacting therewith to deliver at a single setting all the letters of a particular class contained in said magazine irrespective of their location relative to each other.

94. In a mail classifying system, the combination of a magazine for mixed indexed letters, means independent of the magazine for indexing letters, an endless letter conveyer to propel said letters and separate manually controlled means whereby letters can be selected from said magazine by their indexes.

95. In a mail classifying system, the combination of a magazine for mixed indexed articles, means for indexing said articles, manually controlled means acting on the indexes, and means for propelling said articles past said means, whereby articles of a given index can be selected from said magazine by said manually controlled means.

96. In a mail classifying system, the combination of letter moving and directing mechanisms constructed and arranged to take the pieces of mail matter individually from a common source and deliver them at a common discharge station class by class successively, and a series of controlling devices for the said mechanisms determining the particular class in which each letter is delivered.

97. In a mail classifying system, the combination of letter conveying means for successively receiving the individual pieces of mail matter and a unitary discharge station, and means controlled by the operator for delivering the mail matter at said discharge station in a stack made up of separate classes in succession, each letter being delivered in its proper class.

98. In a mail classifying system, the combination of a plurality of address-inspection stations, means for successively taking pieces of mail matter from a common source and delivering the same to the address-inspection stations, means at each station for identifying each letter presented with a particular class, and a magazine adapted to receive the letters for classification irrespective of the order in which they were taken from the common source.

99. In a mail classifying system, the combination of a receiving table, letter moving and directing mechanisms constructed and arranged to take individual pieces of mail matter from a common source and deliver them at the receiving table class by class in succession, and controlling means including a plurality of keyboards acting on said mechanisms to determine the particular class in which each piece of mail matter is delivered, substantially as shown and described.

100. In a mail classifying system, the combination of letter conveying devices arranged to receive the letters from a common source and deliver the same at a common discharge point in various predetermined classes, means controlling the classes in which the letters are individually delivered, and series of operating devices operatively connecting with said controlling means and respectively corresponding to and indicating the various classes in which the letter is delivered or predetermined by the operation of the device corresponding to and indicating such class.

101. In a mail classifying system, the combination of letter conveying devices and controlling means whereby the letters are moved from a common source and delivered at a common point in predetermined classes, a series of separately movable operating members corresponding to and indicating said classes to which the letters are delivered respectively, and actuating connections moved by said operating members and governing said controlling means respectively to determine the particular class in which each letter is delivered.

102. In a mail classifying system, the combination of letter-moving and controlling devices for removing the pieces of mail matter successively from a common source, a common receptacle, and means controlled by the operator for delivering the mail matter in predetermined classes to the common receptacle.

103. In a mail classifying system, the combination, with a common depository, of means for supporting pieces of mail matter at a common source, means for receiving pieces of mail from the common source, and means coöperating with the receiving means for selecting and rejecting and delivering the pieces of mail matter in successive predetermined classes at said common depository.

104. In a mail classifying system, the combination of letter guideway with moving and controlling devices including directing elements for the letters and means along the guideway coacting therewith for delivering pieces of mail matter from a common source to a common delivery point in various predetermined classes as controlled by the operator, and means for halting or stopping a plurality of pieces in the guideway for inspection and before being delivered in a predetermined class at said common delivery point.

105. In a mail classifying system, the combination of carriers having settable devices, means for successively loading letters into the carriers, means for simultaneously setting the devices on a plurality of carriers, and means coacting with said devices for successively discharging the carriers of their contents.

106. In a mail classifying system, the combination of a common delivery table, letter conveying devices leading thereto, a magazine containing letters, holders for the letters, the mail being classified mechanically by said holders, selective means acting on said holders for removing mail of a certain class therefrom, and conveying means acting to deliver the same in succession at said common delivery table.

107. In a mail classifying system, the combination of a plurality of holders for letters, a magazine adapted to contain said holders, the mail being arranged and classified mechanically by said holders, means for placing mail matter in said holders, selective devices coöperating with the holders for removing classes of mail from the magazine, a common delivery receptacle, and conveying means leading mail by said classes and in succession to said common delivery receptacle.

108. In a mail classifying system, the combination of a common delivery receptacle, carriers for the individual pieces of mail matter having a settable indexing device, means for setting said indexes according to the address of the letter, a magazine for receiving said pieces of mail matter and means bringing the mail matter thereto, devices coöperating with the carriers while in said magazine, means for moving the carriers past the same to cause the selection of mail of a certain class from the magazine without disturbing undesired pieces and having means for receiving the mail thus selected in classes and depositing the same in the common delivery receptacle.

109. In a mail selecting system, the combination of a guideway, an inspection station adjacent thereto, free carriers for successively carrying letters on said guideway to and from said station, and means including manually operable controlling means at said stations for classifying said letters by manipulating the carriers, and means for selecting classified letters.

110. In a mail classifying system, the combination of a series of free carriers movable independently of each other, means for holding the same in a stack, an initial feeder arranged to take letters successively from a stack of letters, and cause delivery of the same each to a carrier from the stack thereof, means for moving the carriers successively into position to receive the individual letters from the initial feeder, and driving means for said last mentioned means.

111. A mail classifying system, having the combination of free letter carriers with a settable feature, means for setting said feature, key levers independent of the carriers for controlling said means for setting, a resettable selecting device coacting with said settable feature, and means for causing a relative movement of the carriers and the selecting device.

112. In a mail classifying system, the combination with a keyboard characterizing mechanism and a classifying machine, of a conveyer between them, and free carriers adapted to hold articles of mail and coöperate with both the characterizing mechanism and the classifying machine and be transported by said conveyer.

113. In a mail classifying system, the combination of free carriers having settable distinguishing members and adapted each to carry an article of mail, endless continuously moving belt conveyers, means on said belt conveyers to engage said carriers, a keyboard machine adapted to set distinguishing characteristics on the carriers, a selecting device resettable to coact with different ones of said distinguishing characteristics, means for causing different settings of said device, and means for causing a relative movement of the carriers and said device.

114. In a mail classifying system, the combination of means to be associated with letters to mechanically classify them, a conveyer adapted to move mixed mail of several classes in an endless circuit repeatedly, a repository, and settable selective means adapted to coact with the first mentioned means to separate from the mixed mail the several classes in succession according to the setting of said means, and means for directing the separated mail to the repository.

115. In an apparatus of the class described, the combination of carriers for letters, a guideway with a gap through which carriers containing letters may be discharged, means for repeatedly circulating letters along the guideway and across the gap, and means for causing certain letters to be discharged through the gap.

116. In a mail classifying system, the combination of settable carriers for the letters, letter carrier conveyers, mechanism to deliver the carriers properly positioned and separately to one of said conveyers, and means for receiving said carriers, setting them, and transmitting them to succeeding conveyers.

117. In a mail handling system, the combination with a characterizing mechanism and a classifying mechanism, of independently movable carriers having a physical indexing means adapted to coact with each of such mechanisms and each provided with means adapted to clamp thereto an individual piece of mail, whereby, for the purpose of mechanical manipulation, the letters of various shapes and sizes within the capacity of the apparatus are reduced to uniform mechanical units.

118. In a mail classifying system, the combination of a station, a letter carrier, a conveyer receiving the carrier and delivering the same to said station for inspection and characterizing, a conveyer taking carriers from said station and feeding them into an endless storage conveyer, and settable discharge mechanism located in the path of said endless storage conveyer adapted to select and remove from said conveyer the carriers of any given class.

119. In a mail classifying system, the combination with propelling mechanism, of a free letter carrier comprising a plate and having a clamp mounted on the same, and means independent of the carrier for automatically operating the clamp to release a letter.

120. In a mail handling system, the combination of a support for a stack of mixed letters, a set of carriers each adapted to receive a letter, and mechanism for feeding the letters singly from the stack to the carriers including a roll intermittently rotated in a direction to feed the letters and a retarding roll rotated in the opposite direction, and means for transporting the carrier with a letter thereon.

121. In a mail handling system, the combination of means for holding a stack of letters, a set of independent plate-like carriers each having a clamp, means for holding the carriers in a stack adjacent to the stack of letters, feeding devices for withdrawing letters singly from the stack and transferring them to the carriers, said feeding devices including an intermittently actuated roll to engage the letter and move it in the feeding direction and a reversely acting retarding roll, and means for automatically opening and closing the clamps on the carriers to allow the letters to be placed therein.

122. In a mail handling system, the combination of means for supporting a stack of letters, a feed roller, means for causing the same to intermittently coact with the foremost letters, a retarding roller continuously rotated in the reverse direction and tending to hold back other letters than the first, a series of carriers in which the fed letters are placed individually, and means for transporting the carriers.

123. In a mail handling system, the combination with carriers, of means for feeding letters from a stack to the carriers individually, said means including a feeding roll mounted on a stationary axis and adapted to engage the front letter in the stack to feed the same toward a carrier, a continuously-rotated bodily-movable roll, and means for intermittently moving the last mentioned roll into and out of engagement with the feed roll whereby the feed roll may act alternately as a feeder and as a retarder for the letter.

124. In a mail handling machine, the combination of means for supporting a stack of letters, means for supporting a stack of plate-like carriers adjacent to the stack of letters, feeding mechanism for feeding the first letter of its stack into the first carrier, there being means on the carrier for holding such letter against its face, and means for transporting the carriers with their letters.

125. In a mail handling system, the combination of means for supporting a stack of letters, carriers, each consisting of a comparatively thin plate provided with a clamping device, means for supporting a set of such carriers in a compact group adjacent to the stack of letters, mechanism for feeding the letters singly from the stack to the individual carriers, mechanism for opening the clamping device on each carrier as the letter is fed to it and thereafter closing it, means for transporting the carrier, means for automatically opening the clamping devices of the carriers to cause them to discharge their letters, and means for thereafter returning the carriers for reloading.

126. In a mail classifying system, letter feeding mechanisms, letter classifying mechanisms, a plurality of similar keyboards, conveyers leading from the feeding mechanisms past the keyboards to the classifying mechanisms, and means whereby letters controlled by one keyboard are directed over a common course without interfering with letters discharged by the other keyboards, and means at the keyboards controlling the class of the letters.

127. In a mail classifying system, the combination of letter feeding mechanisms, a plurality of keyboards, classifying devices including carriers for the individual articles of mail supplied by the feeding mechanisms, and means whereby each keyboard determines the course of a carrier in the classifying devices independently of the control of the associated keyboards over other carriers in said classifying devices.

128. In a mail classifying system, the combination of letter feeding mechanisms, letter classifying devices including carriers, a plurality of sets of manually controlled means independent of the carriers determining the action of the classifying devices on the carriers, and means whereby the sets of manually controlling means may perform their functions simultaneously and independently on separate carriers and said carriers pass through said classifying devices in non-interfering order.

129. In a classifying system, the combination of a magazine for mixed classes of articles, means for selecting and removing articles from the magazine by classes, and means for compacting the articles remaining in the magazine after the extraction of one or more classes therefrom.

130. In a classifying system, the combination of an inspection station, means for feeding unclassified articles to said inspection station, manually controlled means for mechanically indexing said articles according to classes, a magazine for storing the unclassified indexed articles, settable means to co-act with the indexes on the articles to select said articles from the magazine by classes.

131. In a classifying system, the combination of a plurality of inspection stations, means for feeding indexed articles thereto, manually controlled means at each inspection station acting on the indexes to predetermine the classes in which each article will be delivered, a holder for a series of such articles and means whereby the articles from the different inspection stations are delivered mutually interspersed and comingled in their respective classes in said holder.

132. In a classifying system, the combination of a plurality of inspection stations, means for feeding unclassified articles thereto, manually controlled means at said inspection stations predetermining the class in which each article will be delivered, a classifying device common to all the inspection stations, and means whereby the articles from the various inspection stations are delivered successively to the classifying device without interference with each other.

133. In a classifying system, the combination of a plurality of indexing stations for indexing articles by class, a classifying device common to all of said indexing stations, and means whereby the indexed articles are delivered successively and in non-interfering order to said classifying device.

134. In a mail classifying system, the combination of multiple keyboards, means operated by any keyboard to direct the delivery of letters into a given class, a magazine for holding the letters in a co-mingled series, and means for conveying the letters from any keyboard to said magazine independently of the others and co-mingling them in said series.

135. In a mail classifying system, the combination of a terminal station adapted to receive mail of various classes, a magazine conveyer adapted to carry an indiscriminate supply of letters, manually controlled means for associating with each letter before it is placed in the conveyer a mechanical distinguishing characteristic, means for transporting letters from said manually controlled means to the magazine conveyer, a device adapted to be set for different classes of mail and in its different settings coacting with the distinguishing characteristics associating with letters of that class in the conveyer, and means operative when such co-action takes place for delivering the selected letters from the magazine to said terminal station.

136. In a mail classifying system, the combination of a terminal station, continuously moving letter conveying means arranged to receive letters successively from a common source and deliver the same at said terminal station, a nonmutilating mechanical index for each letter, and a series of controlling devices for said means whereby said means are controlled to deliver the letters at said terminal station in various predetermined classes successively.

137. The combination with a set of carriers for individual letters, a magazine for said carriers, means for moving the magazine to cause the carriers to travel in a circuit, and a selecting device adapted to engage the carriers in such travel, there being a space at a certain point between carriers in the magazine to enable the resetting of the selecting device while out of contact with carriers.

138. In a mail classifying apparatus the combination of continuously moving conveyers, letter carriers, a settable mechanical index on each carrier, said conveyers and carriers constructed and arranged to successively take individual pieces of mail matter from a common source and deliver the same in various classes at a terminal station, and a series of key levers independent of the carriers indicating the various classes and acting on said mechanical indexes and predetermining the class in which each piece of mail is delivered at said terminal station.

139. In a mail classifying system, the combination with a propelling mechanism, of a free letter carrier adapted to be moved thereby and comprising a plate and a spring clamp mounted thereon, mechanism to place letters in such clamping device, and means to remove letters therefrom.

140. In a classifying system, the combination of a magazine, articles mechanically indexed contained in indiscriminate order in said magazine to be classified, and settable means to co-act with said indexes to expel articles of any given class and retain in the magazine the articles of the remaining classes, and means for causing a relative movement of the indexed articles and said settable means.

141. In a classifying apparatus, the combination with articles having mechanical characteristics attached thereto, of a magazine charged with such articles to be classified, a receiving station, settable means to coact with such characteristics to determine the class of articles to be delivered from said magazine to said station, means for causing a relative movement of the articles and the settable means, and conveying means to receive and convey said articles from said magazine to said receiving station.

142. In a classifying system, the combination of a central or receiving station, a classifying device, a plurality of inspection stations, manually controlled means at said inspection stations to predetermine the action of said device on articles from said inspection stations.

143. In an apparatus for delivering individual pieces of mail from a common source to a common terminal receptacle in predetermined classes, the combination of a letter support at said common source, conveyers, indexible letter directing mechanisms, and a set of manually operated controlling means coöperating with said directing mechanisms, and corresponding to the respective classes and determining the class in which each letter is delivered at said common receptacle, substantially as described.

144. In an apparatus of the character described, a terminal delivery point for all classes of mail, in combination with letter conveying and directing mechanisms constructed and arranged to receive pieces of mail matter from a common source including manually operable means for mechanically characterizing it, and coöperating means to deliver the same individually in a predetermined class at said delivery point, substantially as shown and described.

145. In a mail classifying apparatus wherein the letters are taken from a common source, successively, and delivered at a common discharge station by classes, the combination of a magazine, a series of controlling devices including key levers corresponding to or indicating the said classes respectively, letter conveying and directing mechanisms receiving the letters from said common source, said directing mechanisms operatively engaging said controlling devices and controlled thereby to direct each letter to the class indicated by the particular controlling device moved by the operator, and a resettable selecting device coöperating with the directing mechanisms.

146. In a mail classifying system, wherein the mixed letters are carried from a common source and respectively discharged at a terminal point in successive classes, the combination of a magazine in which the letters are retained until they are to be delivered, general main way conveyers receiving the letters from a common source, mechanism mechanically characterizing the letters for their respective classes, and selecting mechanism coöperating therewith, and actuating mechanism for the selecting mechanism, whereby each letter is delivered at the terminal point in a predetermined class.

147. In a mail classifying system, the combination of a terminal delivery point, conveying and letter controlling devices coacting to carry the letters from a common source, a series of controlling mechanisms corresponding to and indicating the various classes and controlling said devices to mechanically identify each letter with a class indicated by the particular controlling mechanism actuated, and resettable means coacting with said devices to deliver the letters to said delivery point in classes successively.

148. In a mail selecting system, the combination of a group of mixed classes of articles of mail, each article having a characteristic feature attached, said features differing from each other according to the class of the attached articles, mechanically settable selecting means adapted to coact with the said features to separate from the group articles of a given class, and means for moving the articles of mail in an endless circuit past said selecting means.

149. In a selecting mechanism, the combination of members with certain distinguishing characteristics, means for associating letters of certain classes with members having certain characteristics, means adapted to be reset to coact with said characteristics to group the letters according to said classes, and mechanism for resetting the last mentioned means.

150. The combination, in a mail classifying system, of a set of letter carriers free and independent of each other, a frame, a letter carrier passage arranged therein, controlling means acting on carriers in said passage determining the particular class in which each delivers its letter, a series of manually operated push buttons arranged at the front side and carried by said frame and corresponding to and indicating said classes respectively, operative connections between said push buttons and said controlling means, and classifying mechanisms arranged and constructed so that the operation of any push button will cause the delivery of the letter in a carrier to any class indicated by said push buttons.

In testimony whereof, I hereunto affix my signature in the presence of two witnesses.

CHARLES C. CADDEN.

Witnesses:
ARCHER W. RICHARDS,
JUSTIN W. MACKLIN.